(12) United States Patent
Chen et al.

(10) Patent No.: US 10,015,685 B2
(45) Date of Patent: Jul. 3, 2018

(54) NETWORK INFRASTRUCTURE AND SOFTWARE DEFINED REMOTE RADIO HEAD CONTROLLER

(71) Applicant: HON HAI PRECISION INDUSTRY CO., LTD., New Taipei (TW)

(72) Inventors: Bin-Rong Chen, New Taipei (TW);
Chih-Yuan Huang, New Taipei (TW);
Chin-Hung Chien, New Taipei (TW);
Chin-Ning Lai, New Taipei (TW);
Chia-Wei Yuan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/367,538

(22) Filed: Dec. 2, 2016

(65) Prior Publication Data

US 2017/0164215 A1    Jun. 8, 2017

Related U.S. Application Data

(60) Provisional application No. 62/262,929, filed on Dec. 4, 2015, provisional application No. 62/263,735, filed on Dec. 6, 2015, provisional application No. 62/427,895, filed on Nov. 30, 2016.

(51) Int. Cl.
*H04B 7/00* (2006.01)
*H04W 24/02* (2009.01)
*H04W 16/10* (2009.01)
*H04W 88/08* (2009.01)

(52) U.S. Cl.
CPC ........... *H04W 24/02* (2013.01); *H04W 16/10* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 9,288,689 | B2 * | 3/2016 | Lee | H04W 24/00 |
| 2013/0281049 | A1 * | 10/2013 | Lee | H04W 24/00 455/405 |
| 2015/0055633 | A1 * | 2/2015 | Wu | H04W 52/346 370/336 |
| 2015/0334042 | A1 * | 11/2015 | Katayama | H04L 12/4641 455/452.2 |
| 2015/0341206 | A1 * | 11/2015 | Derakhshan | H04L 45/028 709/221 |
| 2016/0227396 | A1 * | 8/2016 | Lee | H04W 60/04 |

* cited by examiner

*Primary Examiner* — Fayyaz Alam
(74) *Attorney, Agent, or Firm* — ScienBiziP, P.C.

(57) ABSTRACT

A network infrastructure for a wireless communication system is disclosed. The infrastructure comprises a fronthaul network, an RRH pool, a radio service chain (RSC). The RSC is coupled to the fronthaul network and the RRH pool for allocating the RRH resources. The RSC comprises an orchestrator and a remote radio head (RRH) controller. The orchestrator is used for receiving a radio resource request from the at least one C-RAN and converting the radio resource request into a RRH specific command. The RRH controller is used for slicing the RRH resources to create virtual RRHs according to the radio resource request.

14 Claims, 25 Drawing Sheets

NETWORK INFRASTRUCTURE AND SOFTWARE DEFINED REMOTE RADIO HEAD CONTROLLER

CROSS REFERENCE TO RELATED APPLICATIONS

This application claims the benefit of U.S. Provisional Application No. 62/262,929, filed on Dec. 4, 2015 and entitled "SOFTWARE DEFINED REMOTE RADIO HEAD AND SOFTWARE DEFINED REMOTE RADIO HEAD CONTROLLER THEREOF" and U.S. Provisional Application No. 62/263,735, filed on Dec. 6, 2015 and entitled "WIRELESS COMMUNICATION METHOD AND SYSTEM INCORPORATING SOFTWARE DEFINED REMOTE RADIO HEAD", the contents of which are incorporated herein.

FIELD

The present disclosure relates generally to the field of wireless communications, and pertains particularly to a network infrastructure and software defined (SD) remote radio head (RRH) controller thereof.

BACKGROUND

The use of mobile communications networks has substantially increased over the last decade. To meet user demand for mobile communications networks, mobile communications network operators have increased the number of base stations and/or base transceiver stations (BTS). Thus, mobile communications networks operators hope to reduce the costs associated with installing and operating the base stations while meeting increased user demand for mobile communication networks.

FIG. 1 is a diagram illustrating a system structure of a radio access network (RAN) 10 in relevant art. Specifically, the system architecture of the RAN 10 adopts a distributed base band units (BBUs) with fixed point-to-point transmission, which can be widely found in the current 4G LTE (long term evolution) network. In FIG. 1, the solid connection lines indicate physical network connections (which may be wired or wireless), while the dashed connection lines represent software interfaces (and the corresponding hardware implementations thereof).

The exemplary RAN 10 comprises a remote radio head (RRH) pool 11 communicatively connected to a distributed BBU 12 through a fixed point to point link, which may use the Common Public Radio Interface (CPRI) standard, the Open Base Station Architecture Initiative (OBSAI) standard, or other suitable fronthaul communication standards and suitable combinations thereof.

The RRH pool 11 comprises a plurality of remote radio heads (e.g., RRHs 110a, 110b, 110c), which may be physically and functionally identical remote radio transceiver units. A remote radio head generally comprises components that include power supply, transceiver, amplifier (power amplifier and/or low-noise amplifier), and duplex filter. The remote radio head is usually installed close to an antenna, or the remote radio head may be structurally integrated with the actual antenna, resulting in an active antenna. As used in this disclosure, the term remote radio head refers to both, a separate remote radio head and a radio head integrated into the active antenna. The RRHs 110 in the RRH pool 11 are at least partially interconnected through network connection.

The distributed BBU 12 comprises a base band unit pool that includes a plurality of base band units (BBUs) 121a, 121b, 121c, an Operation Support System (OSS) 122, and an Element Management System (EMS) 123. The base band units 121a, 121b, 121c are controllably coupled to the EMS 123 through connections that implements suitable software interfaces. The EMS 123 is controllably coupled to the OSS through suitable hardware/software interfaces.

The distributed BBU 12 directly exercises control and resource management over the RRH pool 11. For example, each of the BBUs 121a, 121b, and 121c is connected to a respective RRH (e.g., 110a/110b/110c) in the RRH pool 11 through fixed point-to-point connection.

The distributed BBU 12 is generally situated, operated, and maintained on a mobile network operator (MNO) premises. This kind of RAN often needs an operator to manually set up RRH, fixed links, and BBU configurations, and is generally incapable of re-configuring network resource parameters automatically and/or dynamically to meet different network service requirements. In addition, The MNO of the RAN10 is required to maintain and expand both the sizable RRH equipment (e.g., the RRH pool 11) and the corresponding distributed BBU 12 to fulfill the increasing demand for wireless service. The fixed connection arrangement between the RRH pool 11 and the distributed BBU 12 offers little flexibility, and provides little options for the operators of the mobile communications networks in terms of cost reduction. Moreover, the fixed deployment of the RAN 10 offers little operational flexibility, as such arrangement is often optimized for certain application circumstances, e.g., to fulfill the capacity requirement for a certain peak time and a location, thus may cause over-provision of resource capacity for the rest of the time.

BRIEF DESCRIPTION OF THE DRAWINGS

Implementations of the present technology will now be described, by way of example only, with reference to the attached figures.

DETAILED DESCRIPTION

Figure 1:
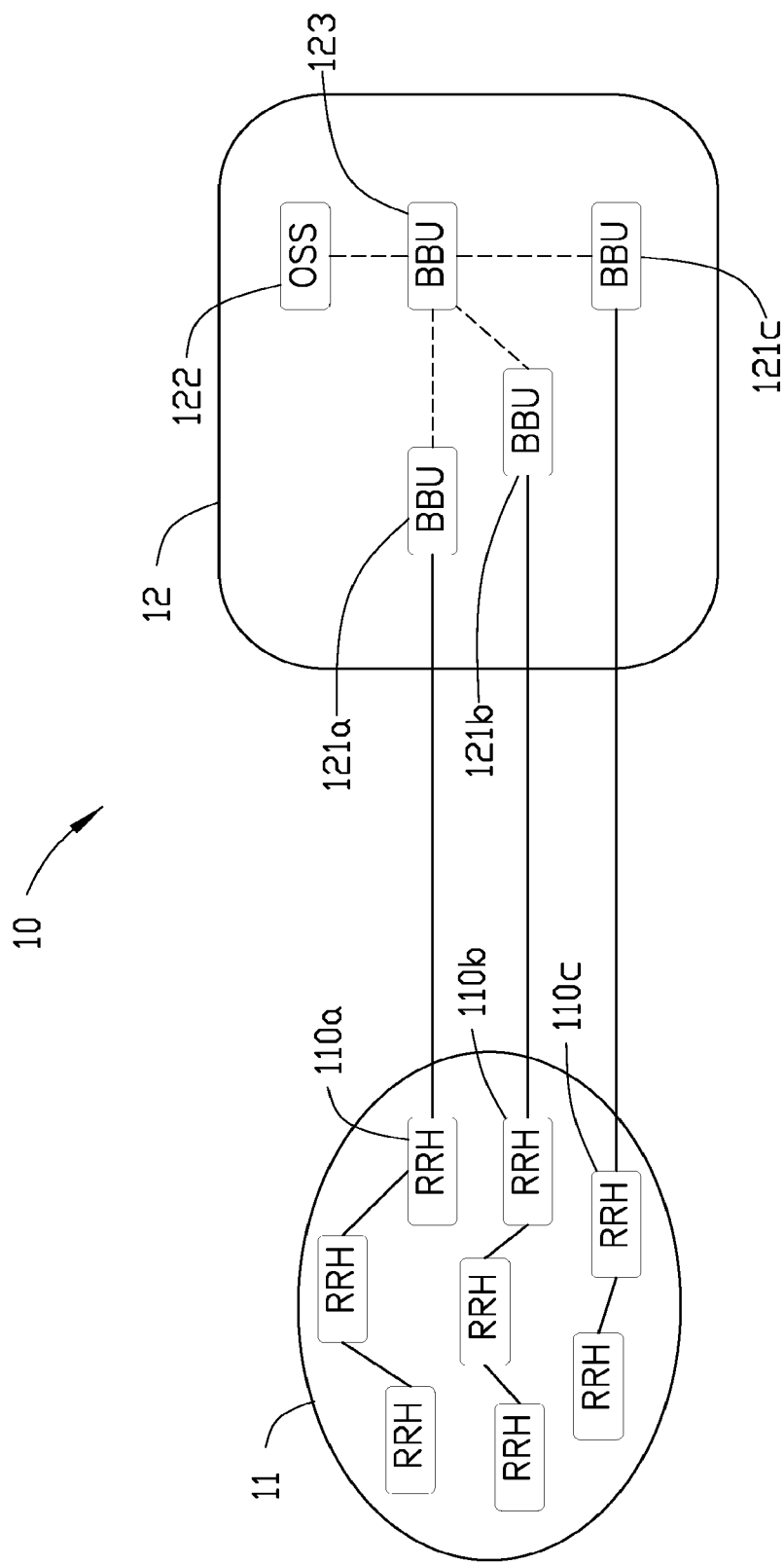
FIG. 1 is a diagram illustrating a system structure of a radio access network in the relevant art.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The term "comprising", when used, means "including, but not necessarily limited to"; it specifically indicates open-ended inclusion or membership in the so-described combination, group, series, and the like.

Figure 2:
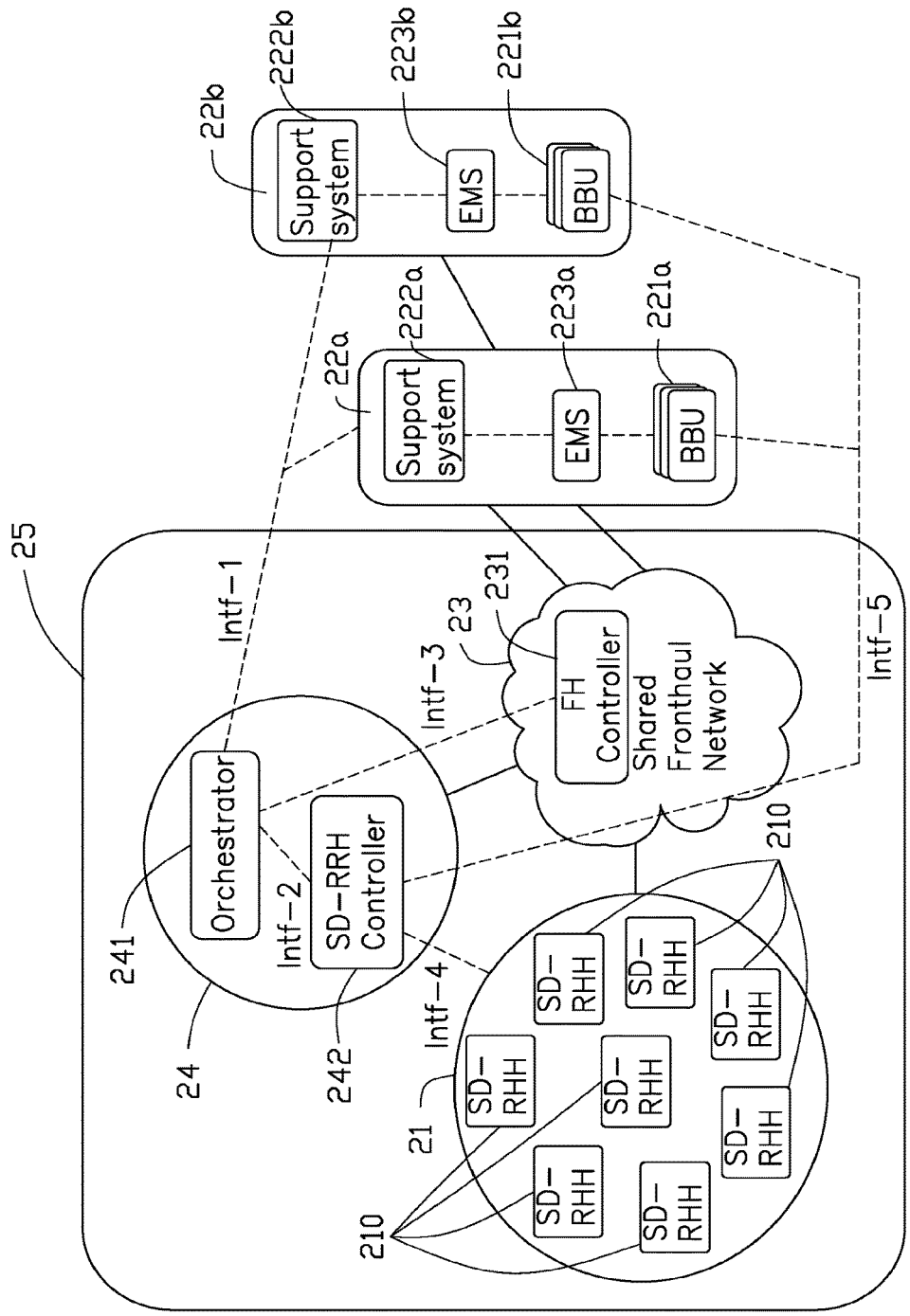
FIG. 2 is a schematic diagram of system architecture of an exemplary embodiment of a radio access network.

FIG. 2 is a schematic diagram of an exemplary embodiment of a system architecture of an exemplary radio access network (RAN) 20. Specifically, FIG. 2 shows the system architecture of a radio access network (RAN) 20 that adopts a Radio Service Chain (RSC) model. In FIG. 2, the solid connection lines indicate physical network connections (which may be wired or wireless), while the dashed connection lines represent software interfaces (and the corresponding hardware implementations thereof).

The exemplary RAN 20 comprises a network infrastructure 25 and a plurality of BBU pools (e.g., C-RAN domains 22a, 22b). The network infrastructure 25 comprises a shared RRH pool 21 communicatively connected to the BBU pools through a shared fronthaul network 23 and a radio service chain (RSC) 24. The shared RRH pool 21 comprises a plurality of software defined remote radio heads (SD-RRHs) 210 for providing physical RRH (pRRH) resources.

Each of the C-RANs 22a/22b comprises a base band unit pool that includes a plurality of BBUs 221a/221b, a Support System 222a/222b, and an Element Management System (EMS) 223a/223b. The BBUs 221a/221b are controllably coupled to the EMS 223a/223b, respectively, through a connection that implements suitable software interfaces. The support system 222a/222b is used for supporting various end-to-end telecommunication services. The support system 222a/222b can be an Operation Support System (OSS) or a Business Support System (BSS). The OSS could cover at least the following five functions: network management systems, service delivery, service fulfillment, service assurance, customer care, wherein the service fulfillment includes the network inventory, activation and provisioning. The BSS deals with taking care of orders, payment issues, revenues, etc. It supports four processes: product management, order management, revenue management, and customer management.

The EMS 223a/223b consists of systems and applications for managing network elements (NE) on the network element-management layer (NEL) of the Telecommunications Management Network (TMN) model. The EMS's key functionality is divided into five key areas—Fault, Configuration, Accounting, Performance and Security (FCAPS).

Each of the EMS 223a/223b is controllably coupled to the support system 222a/222b, respectively, through suitable hardware/software interfaces. Under the RAN 20, each of the C-RANs 22a/22b may be owned and operated by an individual MNO, and concurrently share resources of the shared RRH pool 21 through the implementation of the RSC 24 and the shared fronthaul network 232 (e.g., fronthaul (FH) controller 231).

The shared fronthaul network 23 incorporates a fronthaul (FH) controller 231 capable of managing the fronthaul (FH) resources. The C-RAN domains 22a, 22b are respectively connected to the shared RRH pool 21 through the shared fronthaul network 23. The shared fronthaul network 23 between the C-RAN domains 22a, 22b and the shared RRH pool 21 comprises physical network connections, and may be implemented in wired links, wireless links, or a suitable combination thereof.

The RSC 24 is connected to the shared fronthaul network 23, and is further in communicative coupling with the C-RAN domains 22a, 22b and the shared RRH pool 21. Specifically, the RSC 24 comprises an orchestrator (e.g. RRH infrastructure orchestrator) 241 and a software defined RRH (SD-RRH) controller 242, communicatively coupled with each other through a software interface (e.g., intf-2). The orchestrator 241 is further coupled to the support system 222a/222b of the C-RAN domain 22a/22b through software interface (intf-1) and to the FH controller 231 through software interface (intf-3). The orchestrator 241 is configured to receive resource configuration instructions from the respective support systems 222a, 222b and issue resource allocation requests to the SD-RRH controller 242 and the FH controller 231 accordingly. Accordingly, the orchestrator 241 coordinates the resource allocation between shared RRH pool 21 and the FH network 23.

The SD-RRH controller 242 is communicatively coupled to the shared RRH pool 21 through software interface (intf-4) and coupled to the BBU pools 221a, 221b of the C-RAN domains 22a, 22b through software interface (intf-5). The SD-RRH controller 242 is configured to segment the physical RRH resources of the shared RRH pool 21 into multiple SD-RRH slices, so as to create software defined virtual RRHs, using a single or multiple SD-RRH slices. Particularly, the SD-RRH controller 242 is designed to allocate RRH resources according to a request from the support system 222a/22b, provide unified interface (NB-Intf) for upper layer applications to request the RRH resources, and use a SB-Intf to perform configuration and management on physical RRHs. The software defined virtual RRH can then be dynamically assigned to different BBUs of multiple individual C-RAN domains (e.g., operated by different MNOs).

The software interface (intf-1) comprises communication interfaces between the support system (e.g., 222a/222b) and the orchestrator 241. This software interface (intf-1) enables the support system to request the RRH infra network resources from the orchestrator 241.

The software interface (intf-2) comprises communication interfaces between the orchestrator 241 to the SD-RRH controller 242. This software interface (intf-2) enables the orchestrator 241 to allocate RRH resources with a NB-Intf of the SD-RRH controller 242.

The software interface (intf-3) comprises communication interfaces between the orchestrator 241 and the FH controller 231. This software interface (intf-3) enables the orchestrator 241 to allocate FH resources with a NB-Intf of the FH controller 231.

The software interface (Intf-4) comprises communication interfaces between the SD-RRH controller 242 and the shared RRH pool 21. This software interface (Intf-4) enables the SD-RRH controller 242 to apply RRH configurations with a SB-Intf to setup resource allocation from the shared RRH pool 21.

The software interface (Intf-5) comprises communication interfaces between the SD-RRH controller 242 and the BBUs 221a, 221b of different C-RAN domains 22a, 22b. This software interface (Intf-5) enables the SD-RRH controller 242 to control the BBUs to execute RRH C&M (Control & Management) actions through a SB-Intf thereof.

Under this framework, the FH network 23 can be shared by different operators, which in turn enables dynamic sharing of shared RRH pool 21 between different C-RAN domains (e.g., C-RAN domains 22a, 22b). Accordingly, the proposed architecture in accordance with the present disclosure may achieve more flexible and cost-effective RAN sharing between different MNOs.

Figure 3:
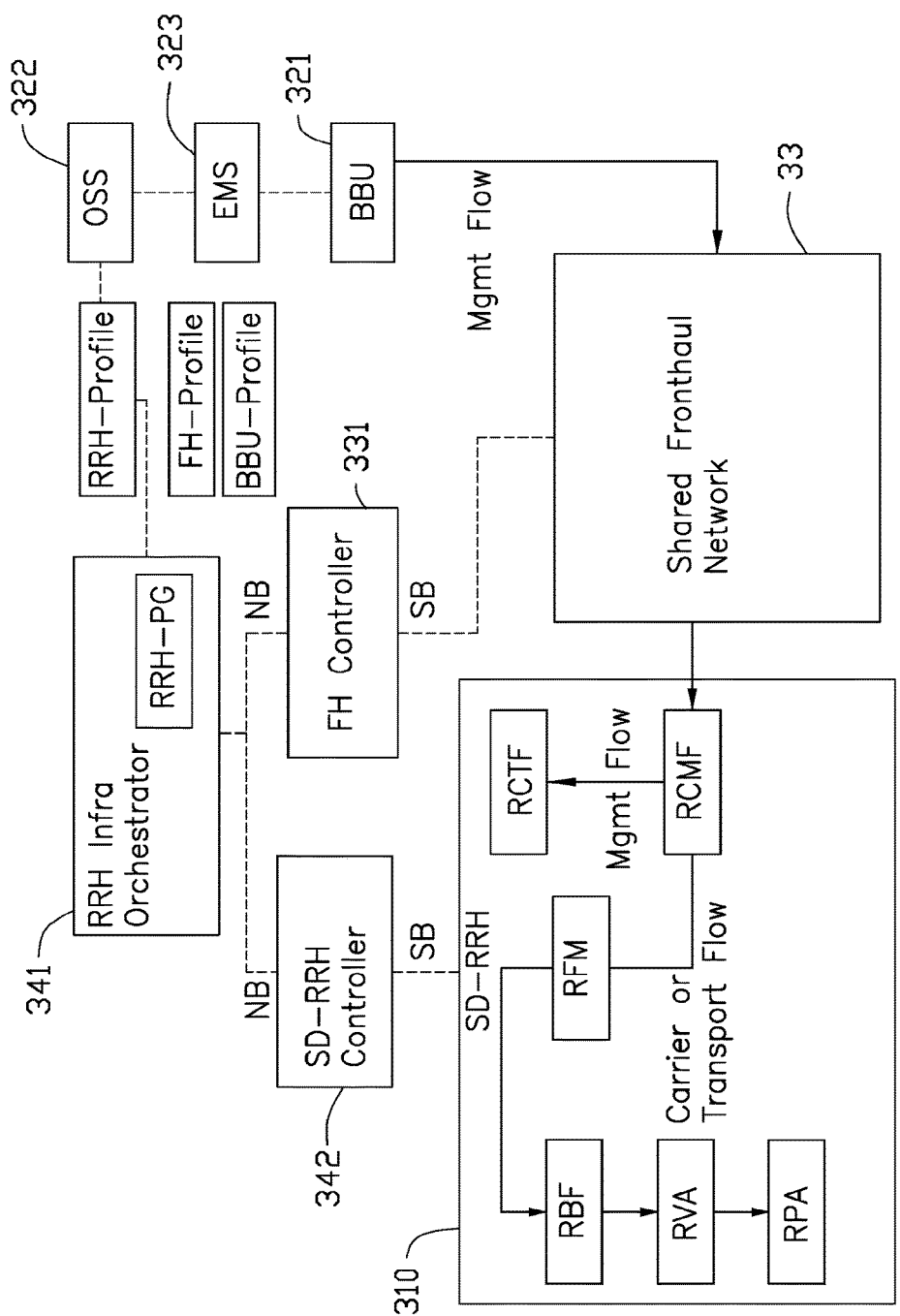
FIG. 3 illustrates a schematic diagram showing an exemplary embodiment of a physical arrangement of a system model for an exemplary radio access network.

FIG. 3 illustrates a schematic diagram showing an exemplary embodiment of the physical arrangement of a system model for a radio access network in accordance with some exemplary embodiments of the present disclosure. The schematic diagram of FIG. 3 can be used in the RAN 20 of FIG. 2. The radio service chain may refer to a radio data processing graph formed by at least one sequence of multiple virtual RRH and corresponding fronthaul network functions. The physical view of FIG. 3 illustrates how the logical data model of the RSC maps to physical devices, and describes the location of functions inside different physical devices and the relationship there-between.

For instance, the BBU/RRH/FH profiles are configuration profiles exchanged between the OSS 322 and the RRH Infra Orchestrator 341 for the purpose of RSC resource allocation. The RRH Infra Orchestrator 341 is configured to create a RRH data processing graph (RRH-PG) based on the BBU/RRH/FH profiles sent from the OSS 322, and then the RRH Infra Orchestrator 341 converts the RRH-PG into specific commands for communication with the SD-RRH controller 342 and the FH controller 331. The RRH Infra Orchestrator 341 is further configured to transmit the specific commands to the SD-RRH controller 342 through the latter's NB interface to allocate RRH resources.

The SD-RRH controller 342 is configured to allocate RRH resources and create a virtual RRH (vRRH) accordingly. The SD-RRH controller 342 is also capable of creating a virtual to physical RRH (pRRH) mapping (i.e. a mapping between vRRH and pRRH). For instance, the SD-RRH controller 342 may convert a profile setting of the virtual RRH into corresponding configurations of physical RRH, and apply the configurations to the physical RRH (e.g., the shared RRH pool 21 in FIG. 2) through a SB-Intf. Upon configuration, the physical RRH sets up its internal units and creates the corresponding virtual RRH function instances (e.g. an RRH Flow Manager (RFM), an RRH Communication Function (RCMF), an RRH Control Function (RCTF), an RRH base band function (RBF), an RRH virtual antenna port (RVA), an RRH physical antenna front end (RPA)).

Likewise, the RRH Infra Orchestrator 341 may transmit specific commands to the FH controller 331 through the latter's NB interface to allocate FH resources. The FH controller 331 allocates FH resources and creates a virtual FH network (vFH) accordingly. The FH controller 331 may also create a mapping between the virtual FH and a physical FH (pFH) network device. For instance, the FH controller 331 may convert a profile setting of the virtual FH network into configurations of the physical FH network device, and apply the configurations to the physical FH network device (e.g., the shared fronthaul network 33) through a SB-Intf.

Accordingly, the SD-RRH controller 342 coordinates the physical RRH resources (through resource slicing/partitioning) and form software defined/virtual RRHs (e.g. SD-RRH 310). A Carrier (IQ data) or transport (Non-IQ data) flow containing user data flows between the functional modules of the SD-RRH 310, and is processed along the data processing path inside the SD-RRH 310 (e.g., RFM→RBF→RVA→RPA). On the other hand, a management flow (Mgmt Flow) containing C&M (Control & Management) data is sent from the BBU 321 of a particular C-RAN domain through the shared fronthaul network 33, and will be sent to the RCMF for executing the C&M functions.

The RCMF manages and monitors user or control data traffic transmitted between the BBU 321 and the SD-RRH 310 which have a certain transport protocol. The RCMF handles different transport protocols (e.g. CPRI, 1904.3, Radio over Ethernet (RoE)) according to service requirement from the BBU 321. The RRH function can process the control and management (C&M) data sent from the BBU 321, and execute specified C&M functions. The RCMF further distinguishes between user data and C&M data, and extracts and dispatches them to RFM and RCTF accordingly. The RFM function regulates the carrier (I/Q data) or the transport (non-IQ data) flow containing user data. I/Q data herein represents the data signal modulated and to be transmit from the BBU 321 to targeted mobile devices. The RFM function manages different carrier/transport flows and dispatches them to the proper data processing functions. The RBF executes partial BBU functions (PHY or MAC) according to service requirement from the BBU 321 while a functional split is enabled between the SD-RRH 310 and the BBU 321. The RVA function segments physical antenna functions into slices, and uses single or multiple antenna slices to create virtual antenna ports (or arrays).

Figure 4A:
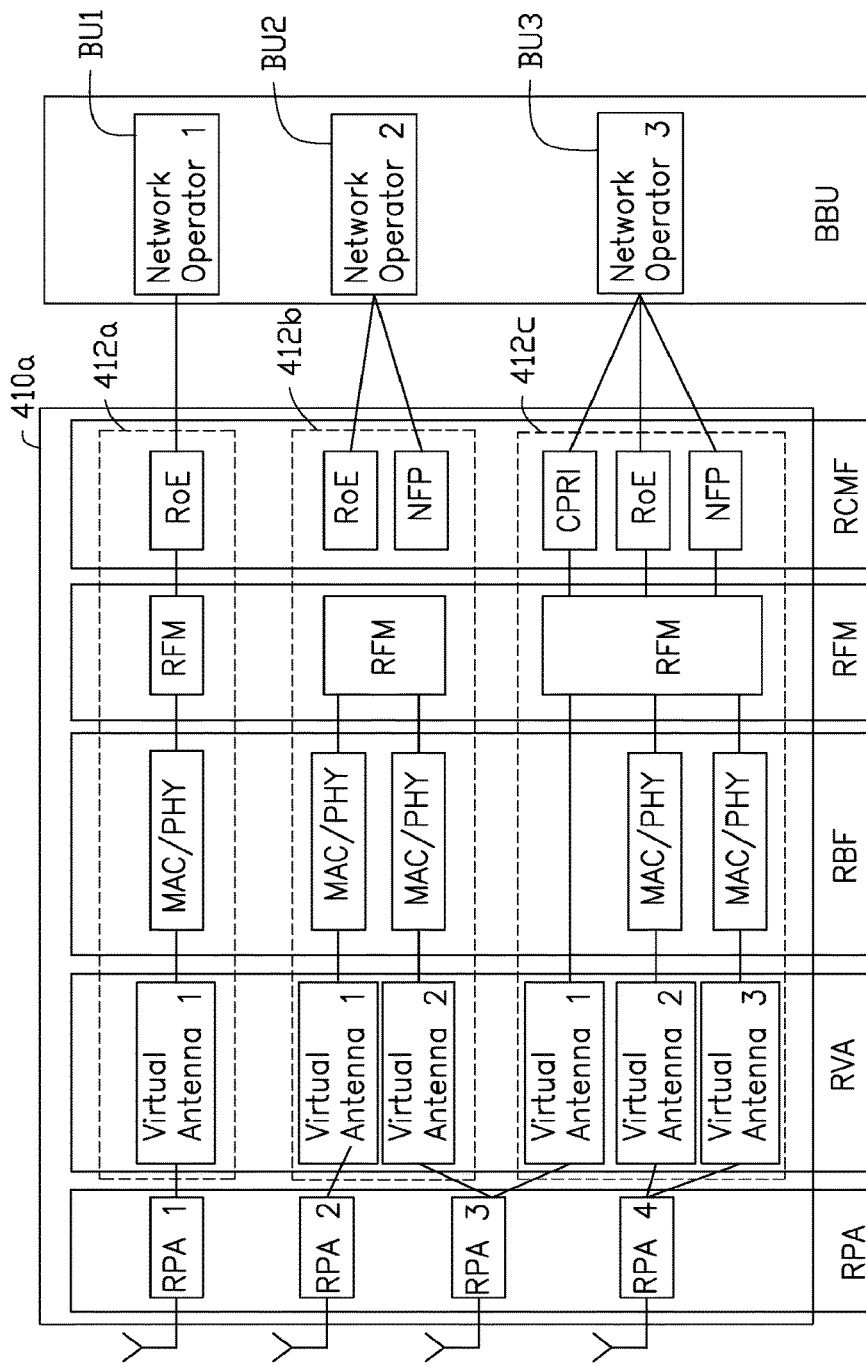
FIGS. 4A and 4B are schematic diagrams illustrating an exemplary embodiment of RRH slicing operations for the RAN 20 in FIG. 2.
Figure 4B:
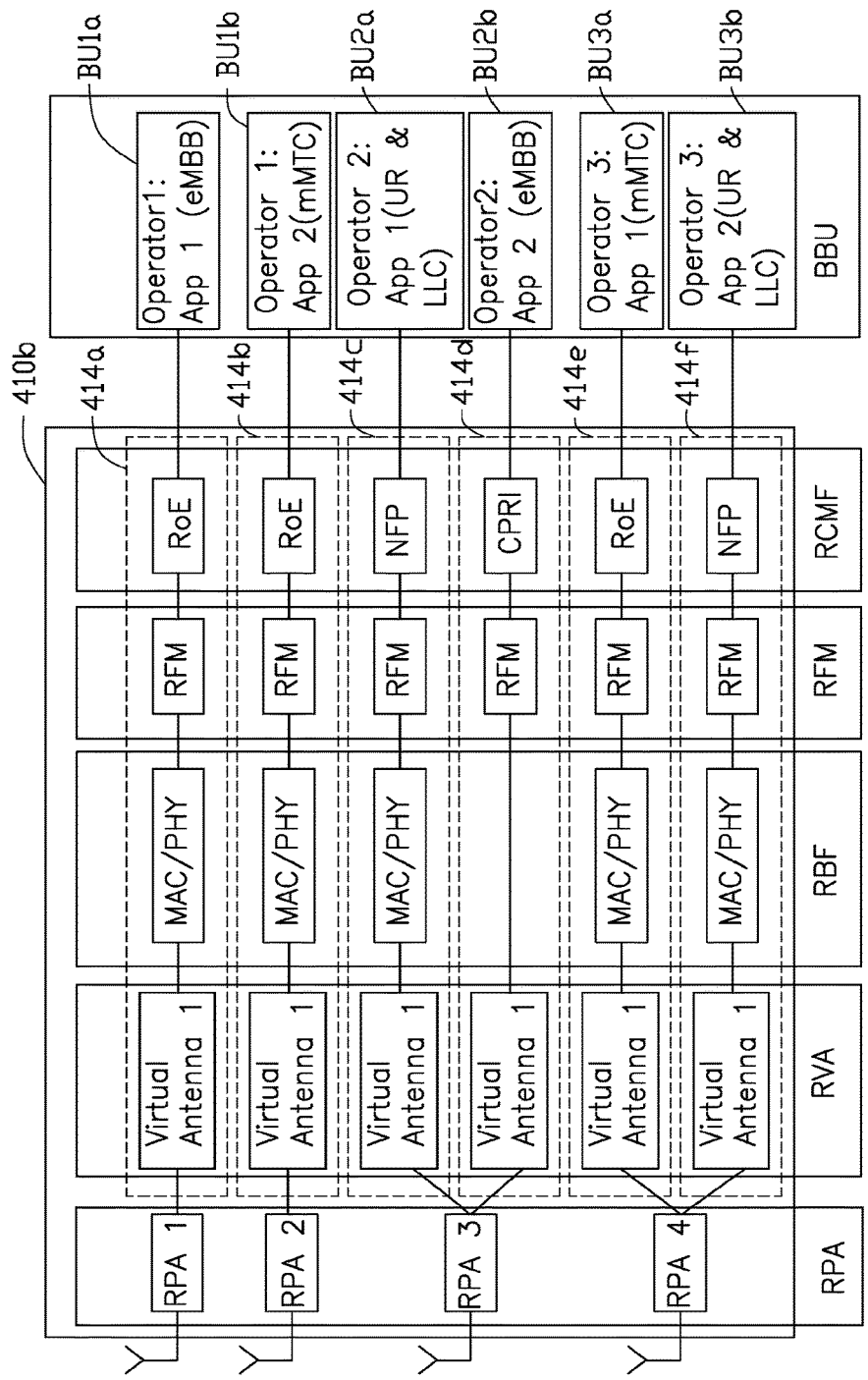

FIGS. 4A and 4B are schematic diagrams illustrating an exemplary embodiment of RRH slicing operations for the RAN 20. In this exemplary embodiment, the RAN 20 may adopt the RSC 24 depicted in FIG. 2. In FIG. 4A, BBUs BU1, BU2, BU3 may correspond to different network operators (e.g. network operators 1, 2 and 3). For instance, the BBU BU1 may correspond to a network operator 1, the BBU BU2 may correspond to a network operator 2, and the BBU BU3 may correspond to a network operator 3.

As an exemplary embodiment, a SD-RRH controller (not shown in FIG. 4A) may, based on resource allocation requests received from an exemplary orchestrator (not shown in FIG. 4A), dynamically allocate RRH resources and create a vRRH accordingly by creating a vRRH to pRRH mapping. The orchestrator sends the RRH resources in response to the resource allocation requests issued from BU1, BU2, and BU3. In one exemplary embodiment, the SD-RRH controller can allocate RRH resources based upon user applications (e.g., real-time/non-real time transmission application) and/or operation requirements (e.g., QoS, peak data rate, area traffic capability, connection density, latency and mobility requirements, and the like) of each network operator.

The exemplary SD-RRH controller (not shown in FIG. 4A) may convert a profile setting of a virtual RRH into configurations of a physical RRH based on the resource allocation requests sent by BU1, BU2, and BU3 and apply the configurations to the physical RRH (e.g., the shared RRH pool) through an SB interface, to form a SD-RRH 410a.

In the exemplary embodiment, the SD-RRH 410a is segmented into six slices of pRRHs, and three virtual RRHs are created, 412a, 412b, and 412c, to correspond to BU1, BU2, and BU3, respectively. In this situation, one pRRH slice is allocated to BU1, two pRRH slices are allocated to BU2, and three pRRH slices are allocated to BU3. The virtual RRHs 412a. 412b, and 412c, consists of RCMF, RFM, RBF, RVA, and RPAs 1-4, for establishing virtual data communication links for BU1, BU2, and BU3 to perform the data communication with mobile devices. The RCMF can be configured to process different types of transport protocols (e.g. CPRI, RoE, and New Fronthaul Protocol (NFP)). The RFM can manage different carrier/transport flows and dispatch them to proper data processing functions. The RBF as described executes partial BBU functions (PHY or MAC layer configurations) according to service requirements from BU1, BU2, and BU3. The RVA consists of virtual antenna 1, virtual antenna 2 and virtual antenna 3. The RPAs 1-4 are shared by multiple RVA functions for transmitting data sent by BU1, BU2, and BU3 to targeted mobile devices (not shown).

Similarly, in FIG. 4B, a SD-RRH 410b is segmented into six slices of physical RRHs, and six vRRHs 414a, 414b, 414c, 414d, 414e, and 414f corresponding to different user applications BU1a/b, BU2a/b, and BU3a/b of network operators are created. Each virtual RRH is formed to correspond to one user application associated with the network operators. The vRRH 414a is allocated to BU1a operating with application 1 (e.g., eMBB). The vRRH 414b is allocated to BU1b operating with application 2 (e.g., mMTC). The vRRH 414c is allocated to BU2a operating with application 1 (e.g., UR & LLC). The vRRH 414d is allocated to BU2b operating with application 2 (e.g., mMBB). The vRRH 414e is allocated to BU3a operating with application 1 (e.g., mMTC). The vRRH 414f is allocated to BU3b operating with application 2 (e.g., UR & LLC). The vRRHs 412a-f consist of RCMF, RFM, RBF, RVA, RPAs 1-4 for establishing virtual data communication links for BU1a/b, BU2a/b, and BU3a/b to perform required data communication with mobile devices (not shown). The functions of the RCMF, RFM, RBF, RVA and RPAs 1-4 in FIG. 4B are identical to those in FIG. 4B, and thus the detailed descriptions are omitted herein.

RRH resources can be thus dynamically sliced into virtual RRHs and allocated to BBUs of different network operators (e.g., operators 1-3), and thereby quality of service (QoS) and security isolation can be guaranteed.

FIGS. 5-8 show an exemplary embodiment of operational process flows of an exemplary radio access network system.

Figure 5:
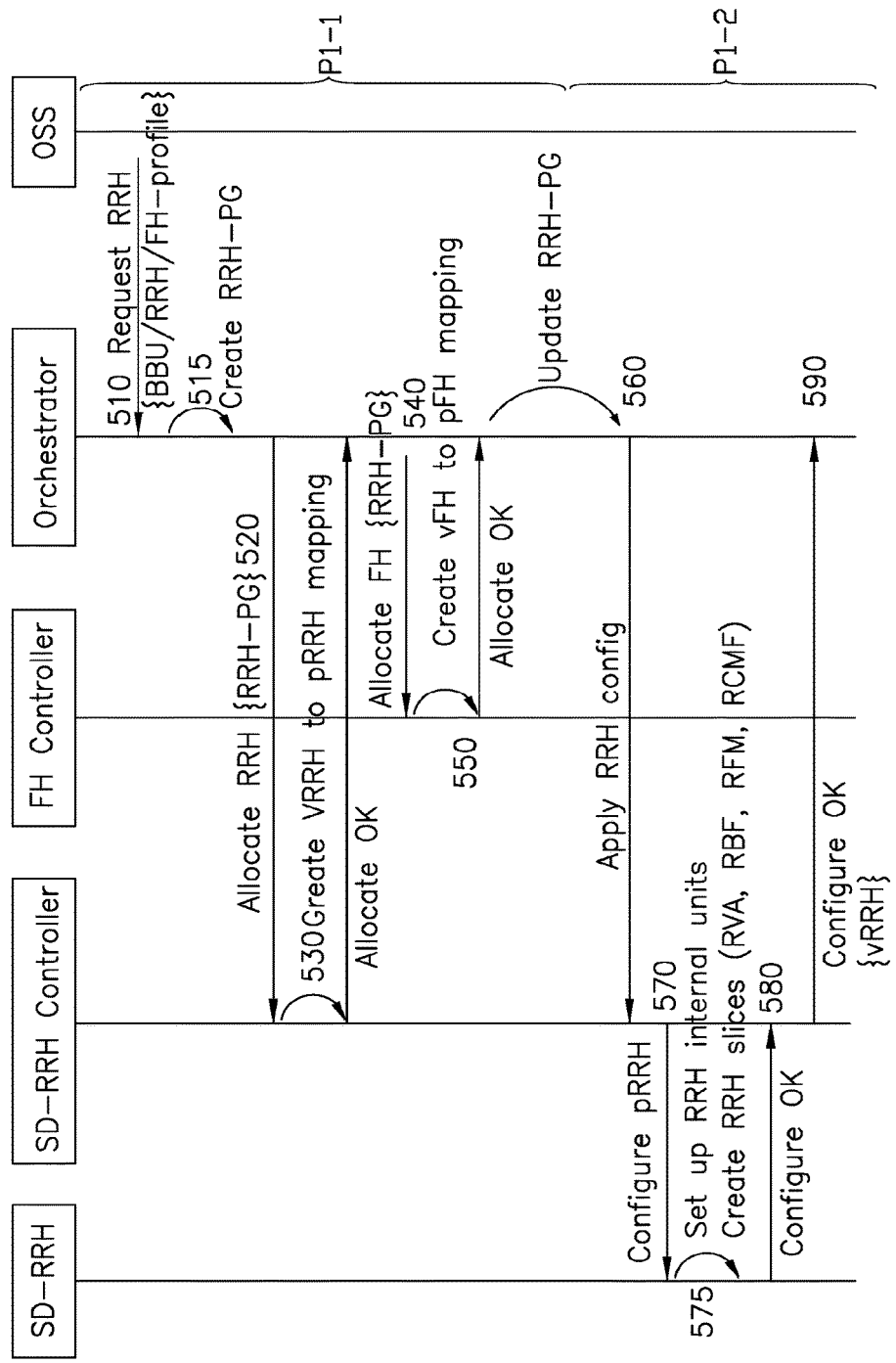
FIGS. 5-8 show operational process flows of an exemplary radio access network.

FIG. 5 shows the initial phase of a radio service provisioning in accordance with some exemplary embodiments of the present disclosure. The process starts from phase P1-1, in which an OSS (e.g., OSS 32a/32b) requests RRH resources from a RRH Infra Orchestrator (e.g., orchestrator 341). The RRH Infra Orchestrator allocates RRH and FH resources accordingly, and creates radio data process graphs (e.g., RRH-PG).

Specifically, in process 510, an OSS (e.g., the support system 22a/22b) transmits a BBU/RRH/FH profile to an orchestrator (e.g., the orchestrator 241) to request RRH resources of a shared RRH pool (e.g., the shared RRH pool 21). Subsequently in an intermediate process 515, a RRH profile describing service requirements of the RRH resources (such as air-Interface, frequency, bandwidth, location, antenna-Topology, function split, compression, and transport protocol) is created. A FH profile describing service requirements of FH resources (such as Bandwidth, QoS) is also generated. A BBU profile describing attributes of BBU (such as BBU-ID and address, and the BBU profile contains information that is required to create a radio data processing graph (i.e. RRH-PG) and sets up a radio data flow) is also created during this process.

In process 520, the orchestrator creates the radio data processing graph basing on the BBU/RRH/FH profile and converts the RRH-PG into specific commands for the communication with a SD-RRH controller (e.g., SD-RRH controller 242) and a FH controller (e.g., FH controller 231). The orchestrator transmits the specific commands to the SD-RRH controller to allocate the RRH resources.

In process 530, the SD-RRH controller allocates the RRH resources (e.g., physical equipment/resources of the shared RRH pool 21) and creates a vRRH profile accordingly. The SD-RRH controller also creates a virtual to physical RRH mapping (pRRH) mapping as below:

vRRH can be represented with {vRRH-ID};

pRRH can be represented with {pRRH Slice-ID} or {Tx/Rx SigPath-ID}. Each Transmit or Receive Signal Path (Tx/Rx SigPath) will be handled by a pRRH slice.

The SD-RRH controller transmits a response to the orchestrator, regardless of OK/Fail.

In process 540, the orchestrator transmits the specific commands to the FH controller to allocate FH resources. The FH controller allocates the FH resources and creates virtual FH network (vFH) accordingly. The FH controller also creates virtual FH to physical FH network device (pFH) mapping.

Please note that the order of process 520 and process 540 may be interchangeable, and may be carried out substantially simultaneously.

In process 550, the FH controller transmits a response to the orchestrator regardless of OK/Fail. If necessary, the orchestrator may update or adjust the radio data processing graph based on the responses of the SD-RRH controller and the FH controller (phase P1-1 is over here).

The process then proceeds to phase P1-2, in which the orchestrator applies the RRH configuration to the SD-RRH controller. The SD-RRH controller accordingly creates a vRRH to pRRH mapping, where the vRRH can be represented with {vRRH-ID}, while the pRRH can be represented with {pRRH Slice-ID} or {Tx/Rx SigPath-ID}. The SD-RRH controller then converts the RRH-PG to corresponding configurations of physical RRHs, and applies the configurations through a SB-Intf.

Specifically, in process 560, the orchestrator requests the SD-RRH controller to apply RRH configuration of virtual RRH to the physical RRH.

In process 570, the SD-RRH controller converts the virtual RRH profile to corresponding configurations of the physical RRH, and applies the configurations to the physical RRH (e.g., the shard RRH pool 21) through a SB-Intf. In an intermediate process 575, the physical RRH sets up internal units and creates virtual RRH function instances.

In process 580, the physical RRH transmits a response to the SD-RRH controller regardless of OK/Fail.

In process 590, the SD-RRH controller transmits a response to the orchestrator regardless of OK/Fail (phase P1-2 is over).

Figure 6:
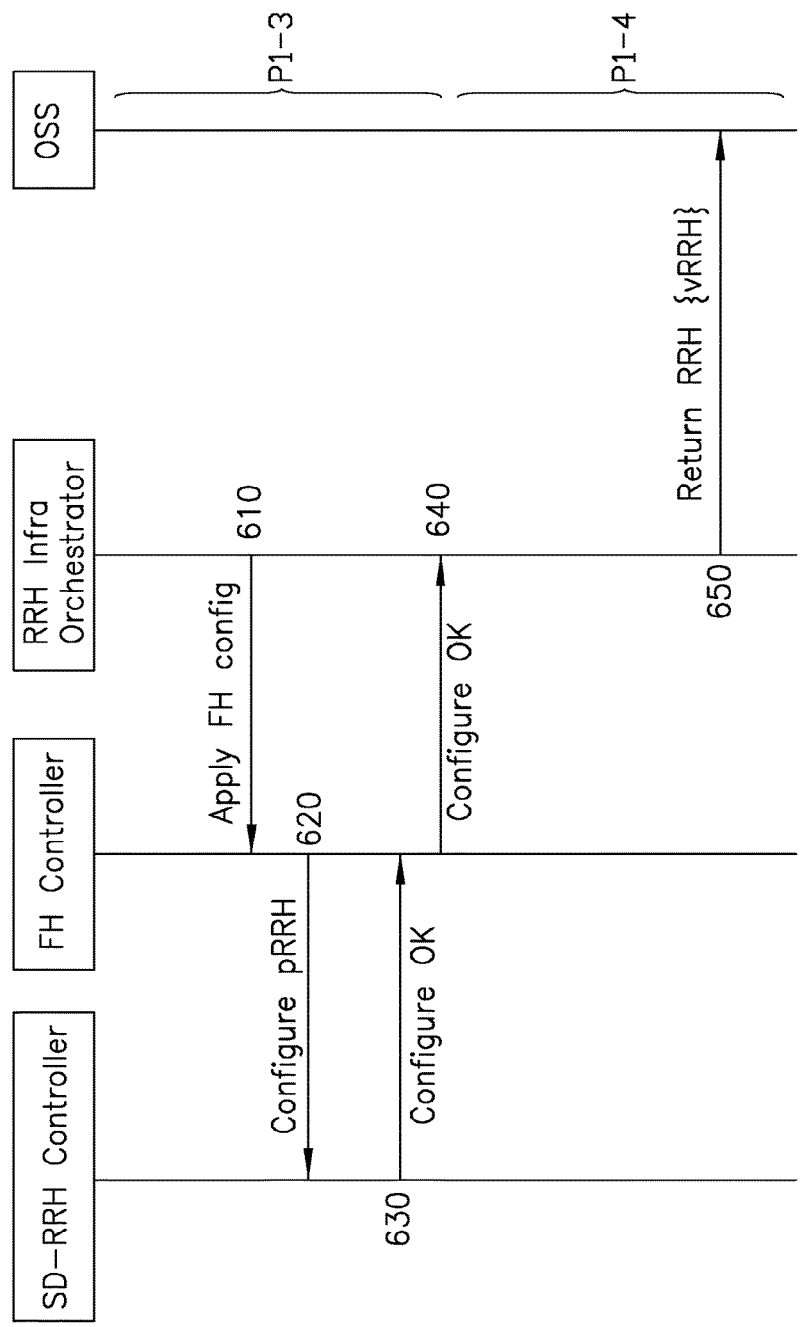

FIG. 6 shows an exemplary embodiment of the subsequent phases of a radio service provisioning in accordance with some exemplary embodiments of the present disclosure. The process then proceeds to phase P1-3, in which the orchestrator applies the fronthaul configurations to the FH controller. In response, the FH controller converts the RRH-PG to physical network configurations, and applies the configurations through a SB-Intf.

Specifically, in process 610, the orchestrator requests the FH controller to apply virtual FH network configuration to physical FH network devices.

In process 620, the FH controller converts virtual FH network to physical FH network device configurations, and applies the configuration to the physical FH network device through a SB-Intf.

In process 630, the physical FH network device transmits a response to the FH controller regardless of OK/Fail.

In process 640, the FH controller transmits a response to the orchestrator regardless of OK/Fail (phase P1-3 is over).

In process 650, the orchestrator returns the vRRH to the OSS (the phase P1-4 is over).

Figure 7:
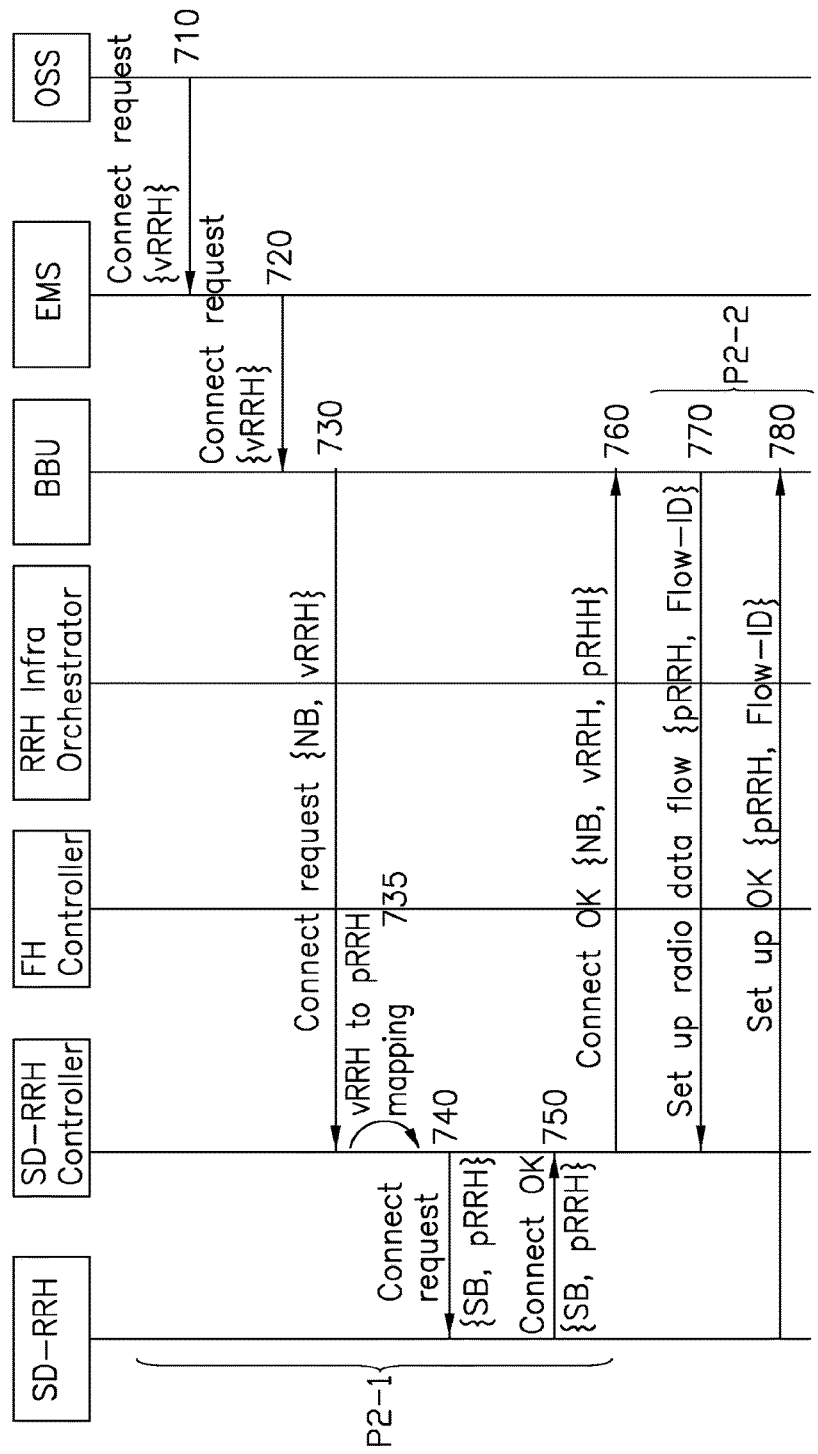

FIG. 7 shows an exemplary embodiment of a second phase of a radio service provisioning in accordance with some exemplary embodiments of the present disclosure. The process then proceeds to phase P2-1, in which the BBU establishes connection with the vRRH. The BBU then sends out a connect request to vRRH by using NB-Intf. The SD-RRH controller then performs mapping between the vRRH and the pRRH, wherein the vRRH is represented by {vRRH-ID}, while the pRRH is represented by {pRRH Slice-ID} or {Tx/Rx SigPath-ID}. The SD-RRH controller then configures the pRRH with a SB-Intf. The SD-RRH controller the returns a connect result back to the BBU.

Specifically, in process 710, the OSS transmits a connect request to the EMS. The connect request contains vRRH information.

In process 720, the EMS transmits the connect request to the BBU accordingly.

In process 730, the BBU sends the connect request to the vRRH by using a NB-Intf of the SD-RRH controller. In an intermediate process 735, the SD-RRH controller performs mapping between the vRRH and the pRRH.

In process 740, the SD-RRH controller configures the pRRH with a SB-Intf.

In process 750, the Physical RRH transmits a response to the SD-RRH controller regardless of OK/Fail.

In process 760, the SD-RRH controller returns a connect result back to the BBU regardless of OK/Fail (phase P2-1 is over).

The process subsequently proceeds to phase P2-2, in which a radio data flow (Flow-ID) is set up between the BBU and the pRRH (wherein Tx SigPath (Downlink): BBU→pRRH→Antenna; and Rx SigPath (Uplink): Antenna→pRRH→BBU). The radio data flow protocol could be in accordance with the CPRI, 1904.3 RoE, or other NFP (New Fronthaul Protocol) standards. For RoE, each radio data flow is identified by the Radio Flow ID, which can also be associated with certain Tx/Rx SigPath inside RRH.

Specifically, in process 770, the BBU sets up a radio data flow between the BBU and the pRRH using the Flow-ID.

In process 780, the Physical RRH transmits a response to the pRRH, regardless of OK/Fail (phase is P2-2 over).

Figure 8:
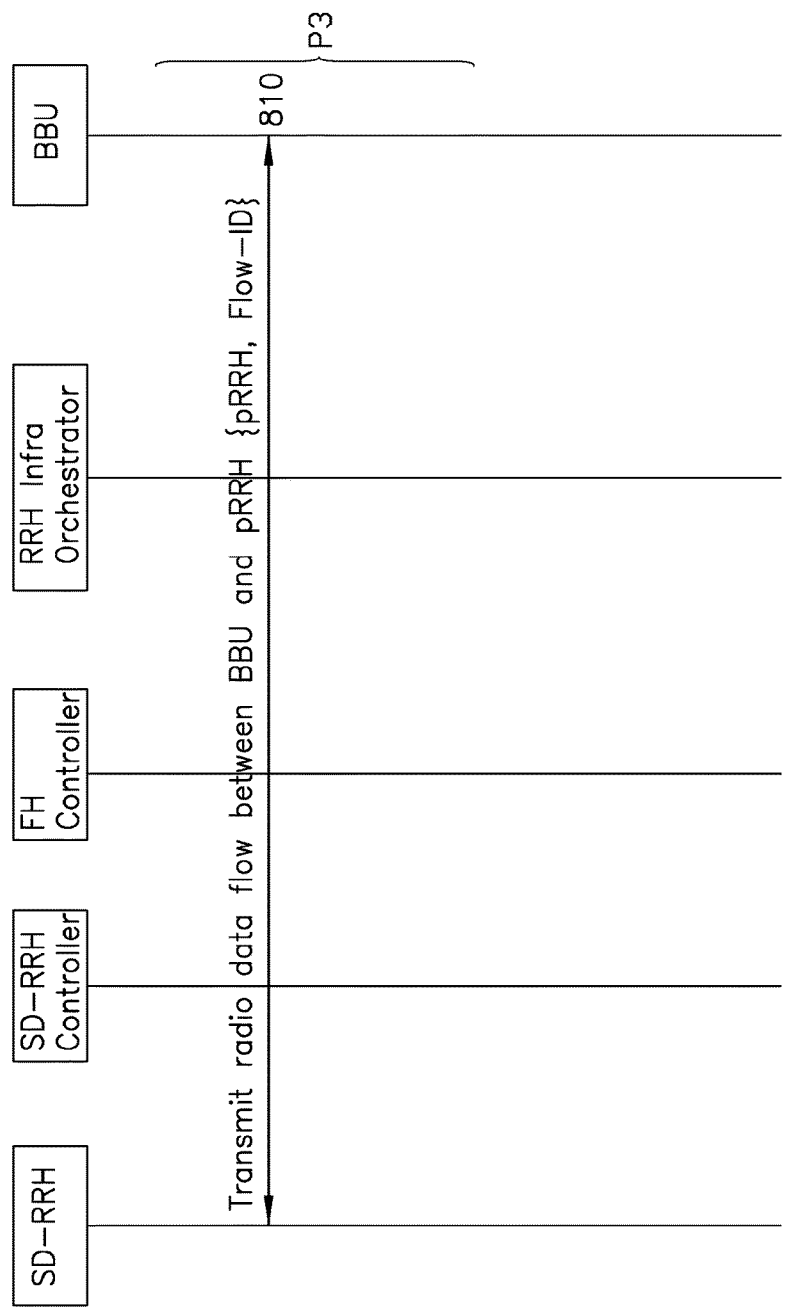

FIG. 8 shows an exemplary embodiment of a third phase of a radio service provisioning in accordance with some exemplary embodiments of the present disclosure. Following the setup of a radio data flow between the BBU and the pRRH, the process proceeds to a phase P3, where data communication is enabled between a BBU in a particular C-RAN domain and the pRRH in the shared RRH pool.

Specifically, in process 810, the BBU is able to start a radio data flow between itself and the pRRH (phase P3 is over).

Figure 9:
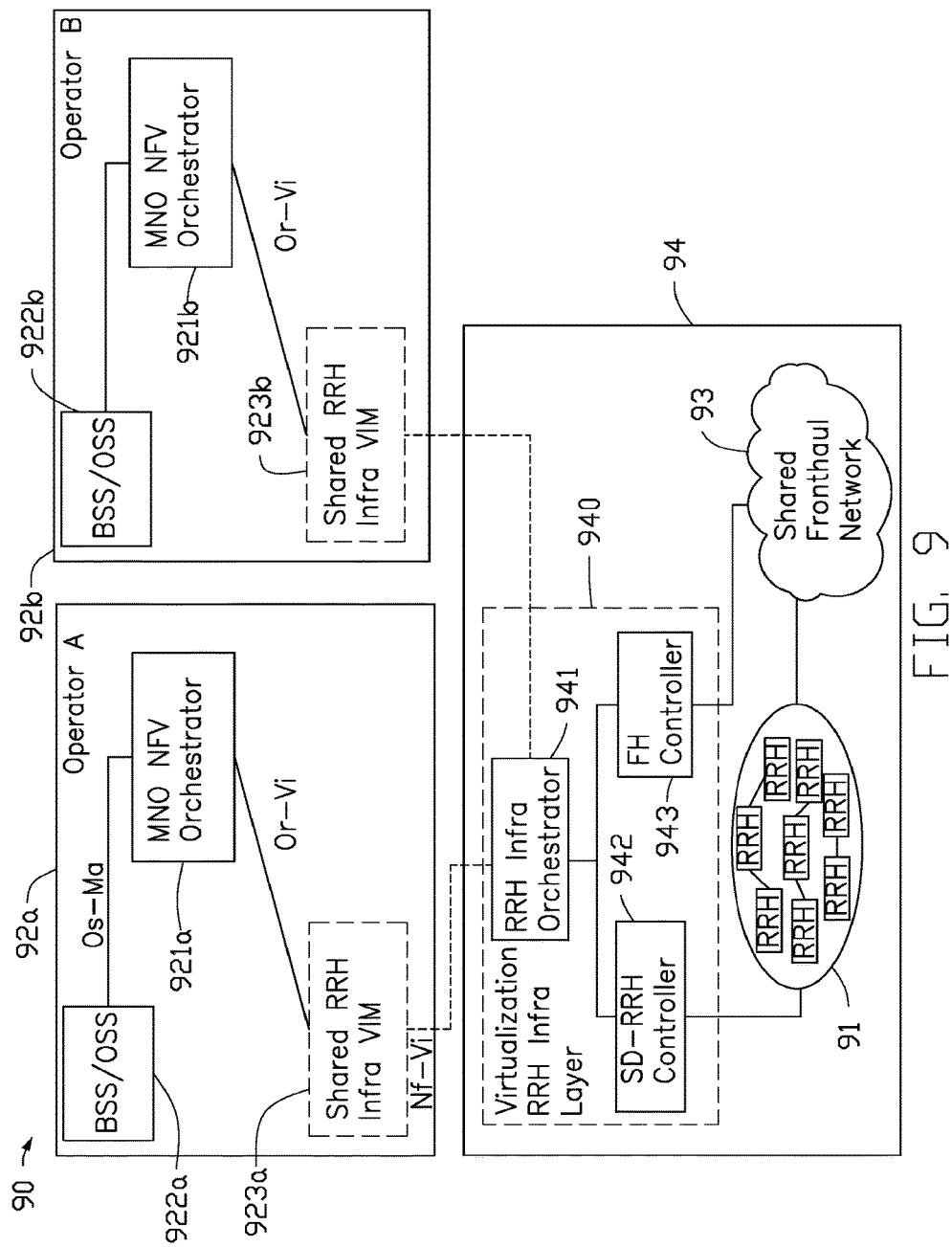
FIGS. 9-10 illustrate schematic diagrams showing physical arrangements of system models for an exemplary embodiment of radio access networks.
Figure 10:
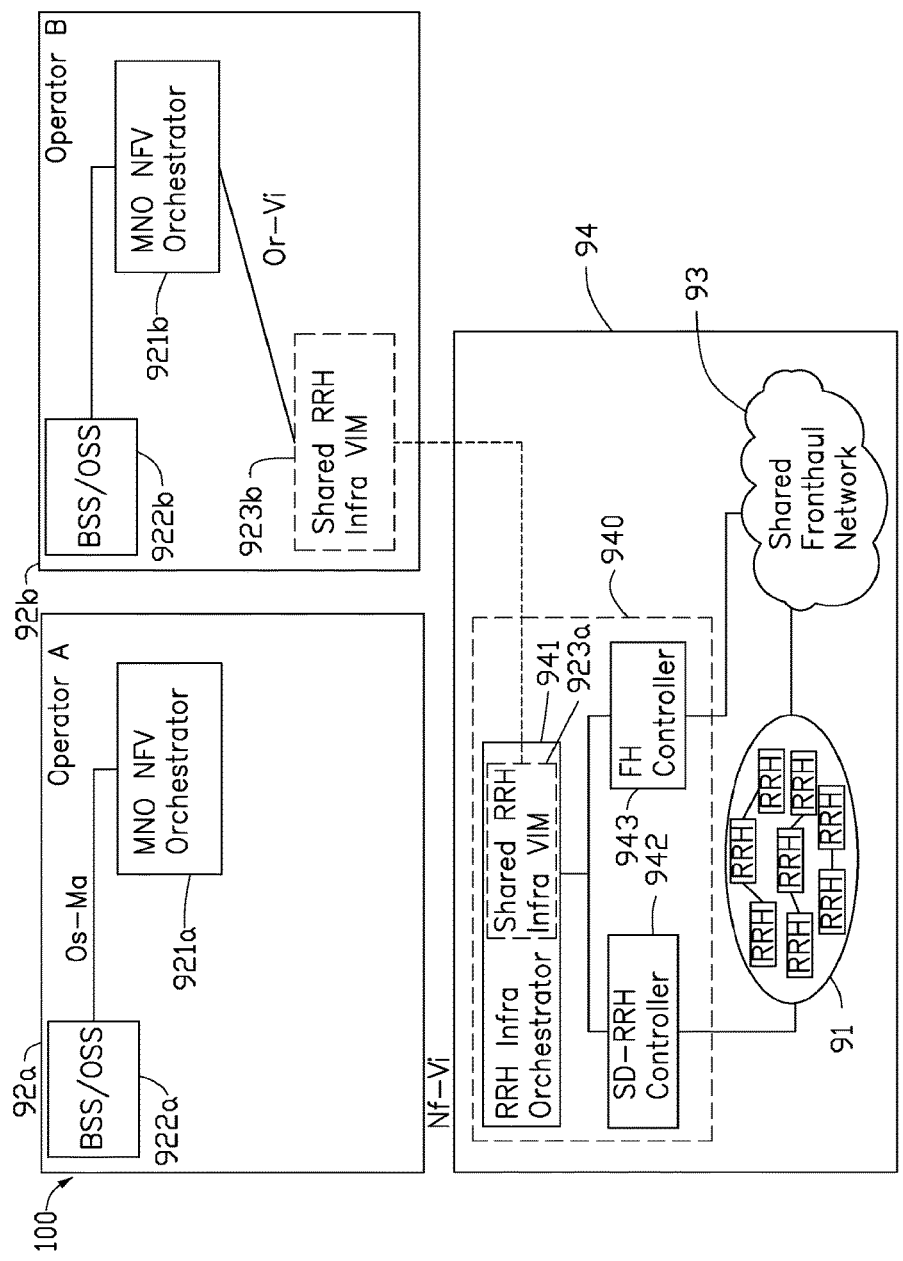

FIGS. 9-10 illustrate an exemplary embodiment of schematic diagrams showing the physical arrangements of system models for radio access networks in accordance with some exemplary embodiments of the present disclosure.

FIGS. 9 and 10 respectively illustrate an exemplary embodiment of schematic diagrams showing the physical arrangement of a system model for radio access networks 90 and 100 adopted in a network function virtualization (NFV) in accordance with some exemplary embodiments of the present disclosure. The physical view of FIG. 9 illustrates how the logical data model of the radio service chain maps to physical devices, and describes the location of each of the functions inside the physical devices and the relationship there-between.

Particularly, FIG. 9 shows a first network operator domain 92a (e.g., Operator A) and a second network operator domain 92b (e.g., Operator B) individually connected to a network infrastructure 94.

As discussed above, the flexibility offered by the software defined shared RRH pool architecture in accordance with the present disclosure enables the creation of a standalone RSC operator (e.g., a provider of the network infrastructure 94). The network infrastructure 94 includes and operates a shared fronthaul network 93 and a shared RRH pool 91 that are controlled and managed by a virtualization layer 940. The virtualization layer 940 comprises a RRH infra orchestrator 941 coupled to a SD-RRH controller 942 and a FH controller 943. The shared RRH pool 91 is controllably coupled to the SD-RRH controller 942, while the shared fronthaul network 93 is controllably coupled to the FH controller 943. As discussed previously, the RRH infra orchestrator 941 may automatically and dynamically coordinate the allocation of network resources (e.g., of the shared RRH pool 91 and the fronthaul network 93) through the SD-RRH controller 942 and the FH controller 943.

Each of the network operator domains 92a, 92b comprises an OSS/BSS module 922a/922b coupled to a MNO NFV orchestrator 921a/921b (through an OS-Ma interface). Each of the MNO NFV orchestrators 921a, 921b is coupled to a virtualized infrastructure manager (VIM) module (i.e. a shared RRH infra VIM 923a/b) through an Or-Vi interface). The NFV framework uses network function virtualization infrastructure (NFVI), which encompasses necessary hardware and associated software components, to provide infrastructure resources where virtual network functions (VNFs) are deployed. A virtualized infrastructure manager (VIM) controls and manages a network function virtualization infrastructure interface (NFVI) to compute, storage, and manage network resources within one operator's Infrastructure Domain. Please note that the MNO NFV orchestrators 921a, 921b might be further connected to other VIM modules, including but not limited to, a C-RAN (BBU) VIM module, a backhaul VIM module, and a core VIM module.

The MNO NFV orchestrator 921a/b in the operator domain 92a/b is communicatively coupled to the RRH infra orchestrator 941 of the network infrastructure 94 through the shared RRH infra VIM 923a/b. In some exemplary embodiments (as shown in FIG. 9), the shared RRH infra VIM 923a/b is allocated in the operator domain 92a/b and owned by the MNO as part of the NFV Management and Orchestration. The RRH Infra VIM 923a/b may communicate with the RRH Infra Orchestrator 941 through the latter's NB-Intf (i.e., Nf-Vi interface).

As a different option, in other exemplary embodiments (as shown in FIG. 10), the shared RRH infra VIM 923a/b may be allocated in the network infrastructure 94. In such instances, the RRH Infra VIM is integrated with the RRH Infra Orchestrator 941 as part of the network infrastructure 94. The MNO NFV Orchestrator 921a/b of the operator domain 92a/b may communicate with the RRH Infra Orchestrator 941 of the RSC 94 through the latter's NB-Intf (i.e., Or-Vi interface). The remaining portion of the network arrangement shown in FIG. 10 is substantially comparable to that depicted in FIG. 9, and therefore will not be repeated for the brevity of disclosure.

FIGS. 11-14 show an exemplary embodiment of operational process flows of a radio access network system in accordance with some exemplary embodiments of the present disclosure. Particularly, FIGS. 11-14 illustrate operational process flows of a radio access network system adopting the NFV framework, as depicted in FIGS. 9 and 10.

Figure 11:
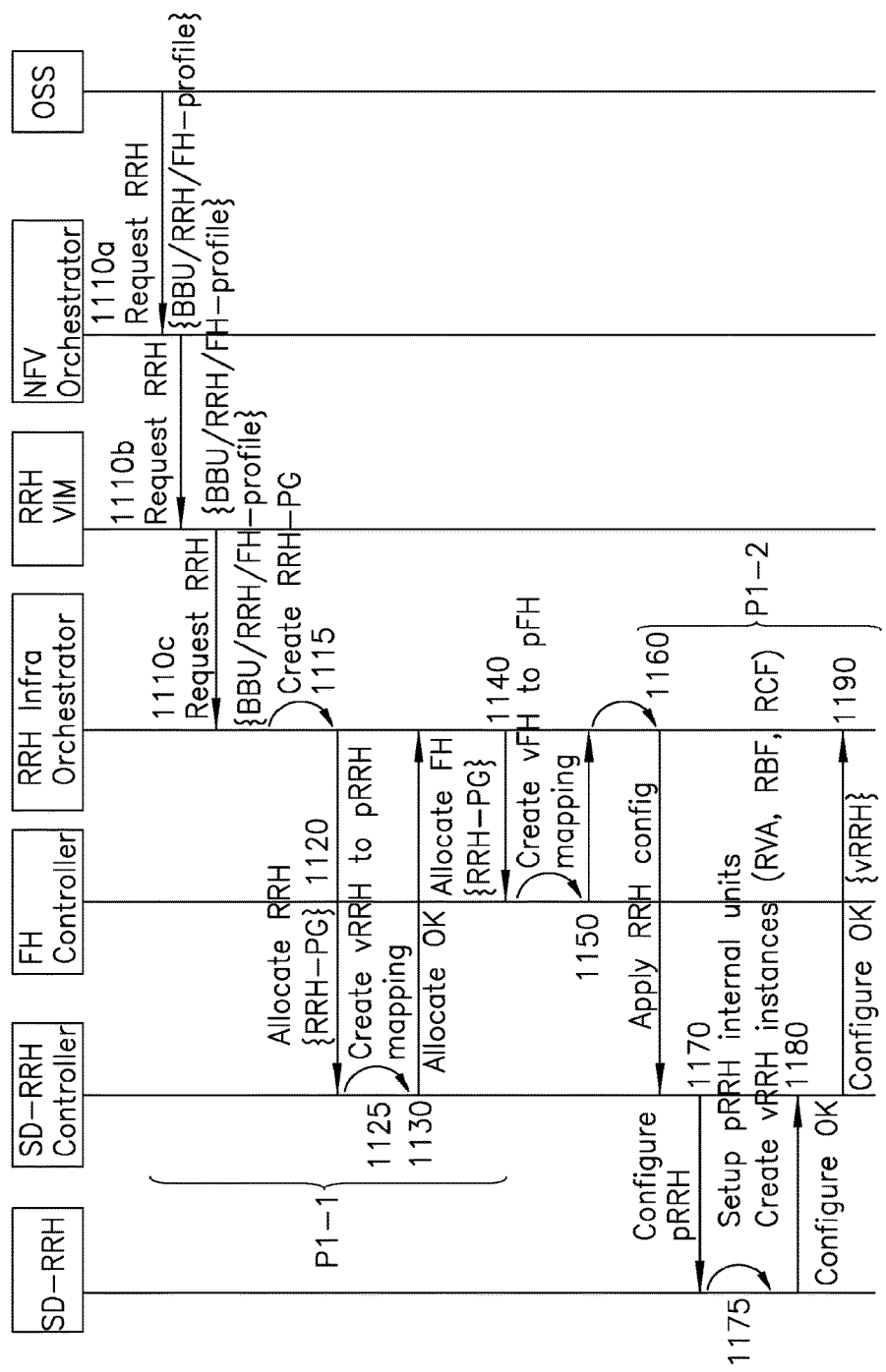
FIG. 11 shows an initial phase of a radio service provisioning in accordance with some exemplary embodiments.

FIG. 11 shows the initial phase of a radio service provisioning in accordance with some exemplary embodiments of the present disclosure. The process starts from phase P1-1, in which the OSS (e.g., OSS/BSS 92a/b) requests RRH resources from the RRH Infra Orchestrator (e.g., RRH Infra Orchestrator 941). The RRH Infra Orchestrator initiates a series of processes to allocate RRH and FH resources (e.g., from the shared RRH pool 91 and the shared fronthaul network 93, respectively) and creates associated radio data process graph(s) (e.g., RRH-PG).

Specifically, in process 1110a, the OSS transmits a BBU/RRH/FH-profile to the NFV Orchestrator to request the resources of RRH infra network. The RRH profile may describe service requirements of RRH resources, such as Air-Interface, Frequency, Bandwidth, Location, Antenna-Topology, Function Split, Compression, Transport protocol. The FH profile may describe service requirements of the FH resources, such as Bandwidth, QoS. The BBU profile may describe attributes of the BBU, such as BBU-ID and Address, and contain information that will be required to create a radio data processing graph (PG) for setting up a radio data flow.

In process 1110b, the NFV Orchestrator transmits the BBU/RRH/FH-profile to the RRH VIM (e.g., shared RRH infra VIM 923a/b) accordingly.

In process 1110c, the RRH VIM forwards the BBU/RRH/FH-profile to the RRH Infra Orchestrator accordingly.

Subsequently in an intermediate process 1115, the RRH Infra orchestrator creates the radio data processing graph basing on the BBU/RRH/FH profile and converts the RHH-PG into specific commands for the communication with a SD-RRH controller (e.g., controller 942) and a FH controller (e.g., FH controller 943). The RRH Infra Orchestrator transmits the specific commands to the SD-RRH controller to allocate RRH resources.

In process 1120, the RRH Infra Orchestrator transmits the specific commands to the SD-RRH controller to allocate RRH resources. Subsequently, in an intermediate process 1125, the SD-RRH controller allocates RRH resources and creates a virtual RRH (vRRH) accordingly. The SD-RRH controller also creates a virtual to physical RRH (pRRH) mapping, wherein a vRRH can be represented with {vRRH-ID}, while a pRRH can be represented with {pRRH Slice-ID} or {Tx/Rx SigPath-ID}.

In process 1130, the SD-RRH controller transmits a response to the RRH Infra Orchestrator, regardless of the allocation status (regardless of whether the response passed or failed, OK/Fail). The RRH Infra Orchestrator transmits the specific commands to the FH controller to allocate FH resources.

In process 1140, the RRH Infra Orchestrator transmits the specific commands to the FH controller to request allocation of FH resources.

In process 1150, the FH controller allocates FH resources and creates a virtual FH network (vFH) accordingly. The FH controller also creates a virtual FH to physical FH network device (pFH) mapping. If necessary, the RRH Infra Orchestrator may update or adjust the radio data processing graph based on the responses of the SD-RRH controller and the FH controller (phase P1-1 is over).

The process then proceeds to phase P1-2, in which the RRH Infra Orchestrator applies the RRH configuration to the SD-RRH controller. The SD-RRH controller accordingly creates a vRRH to pRRH mapping, where the vRRH can be represented with {vRRH-ID}, while the pRRH can be represented with {pRRH Slice-ID} or {Tx/Rx SigPath-ID}. The SD-RRH controller then converts the RRH-PG to corresponding physical RRH configurations, and applies the configurations through a SB-Intf.

Specifically, in process 1160, the RRH Infra Orchestrator requests the SD-RRH controller to apply the virtual RRH configuration to the physical RRH. In doing so, the RRH Infra Orchestrator transmits the specific commands to the SD-RRH controller to allocate RRH resources.

In process 1170, the SD-RRH controller converts virtual RRH resource profile into physical RRH configuration, and applies the configuration to the physical RRH through a SB-Intf. In an intermediate process 1175, the physical RRH sets up its internal units and creates corresponding virtual RRH function instances in response.

In process 1180, the physical RRH transmits a response to the SD-RRH controller regardless of resource allocation status (regardless of whether the response passed or failed, OK/Fail).

In process 1190, the SD-RRH controller transmits a response to the RRH Infra Orchestrator, regardless of OK/Fail (phase P1-2 is over).

Figure 12:
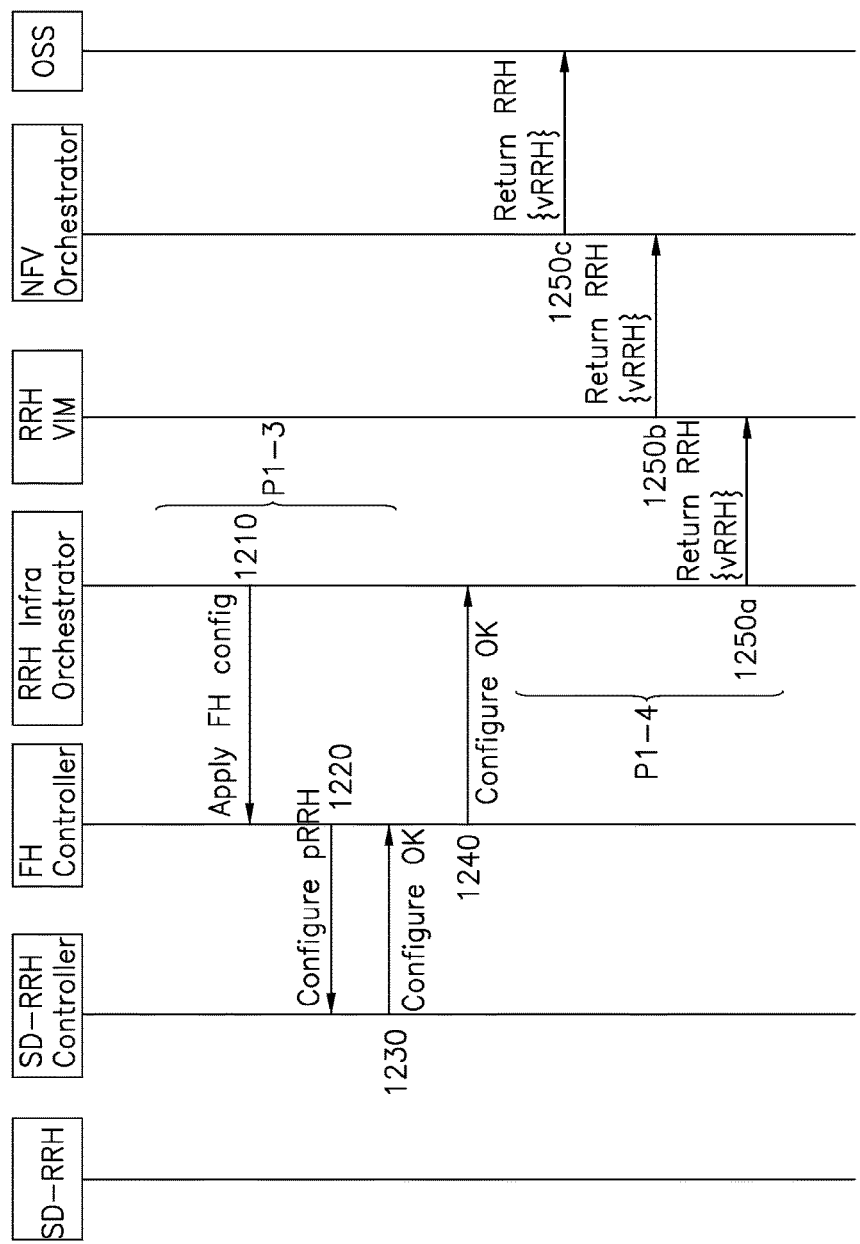
FIG. 12 shows a subsequent phase of a radio service provisioning in accordance with some exemplary embodiments.

FIG. 12 shows the subsequent phase of a radio service provisioning in accordance with some exemplary embodiments of the present disclosure. The process then proceeds to phase P1-3, in which the RRH Infra Orchestrator applies the fronthaul configurations to the FH controller. In response, the FH controller converts the RRH-PG to physical network configurations, and applies the configurations through a SB-Intf.

Specifically, in processes 1210, the RRH Infra Orchestrator requests the FH controller to apply virtual FH network configuration to physical FH network devices.

In process 1220, the FH controller converts virtual FH network to physical FH network device configurations, and applies the configuration to the physical FH network device through a SB-Intf.

In process 1230, the physical FH network device transmits a response to the FH controller, regardless of OK/Fail.

In process 1240, the FH controller transmits a response to the RRH Infra Orchestrator, regardless of OK/Fail (phase P1-3 is over).

The process then proceeds to phase P1-4, in which the RRH Infra Orchestrator returns the vRRH allocation information to the OSS of the MNO domain (e.g., operator A).

Specifically, in process 1250a, the RRH Infra Orchestrator returns vRRH to the RRH VIM. Subsequently, in process 1250b, the RRH VIM then returns the vRRH to the NFV Orchestrator accordingly. Finally, in process 1250c, the NFV Orchestrator returns vRRH to the OSS accordingly (which terminates phase P1-4).

Figure 13:
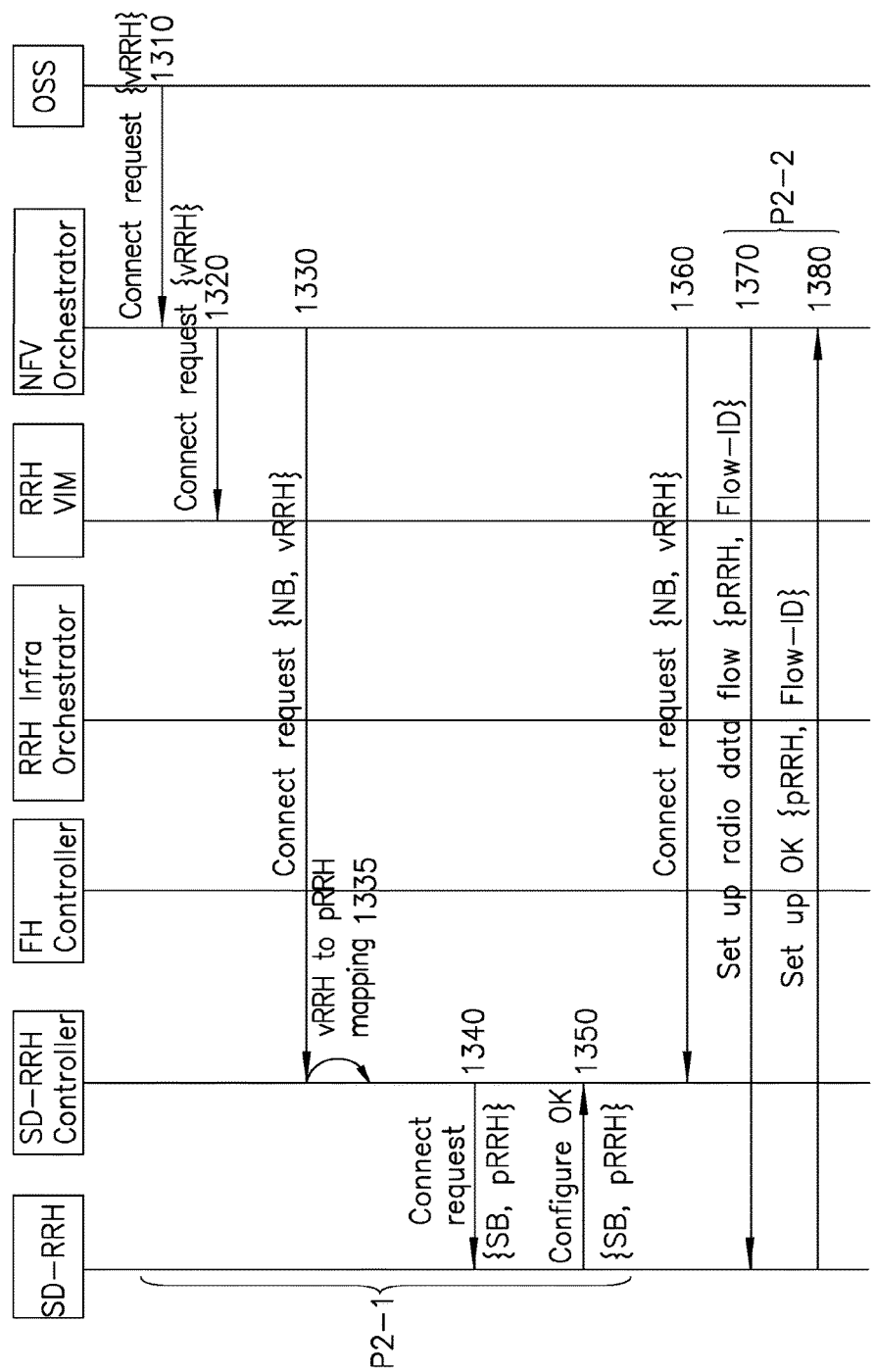
FIGS. 13 and 14 respectively show a second and a third phase of a radio service provisioning in accordance with some exemplary embodiments.
Figure 14:
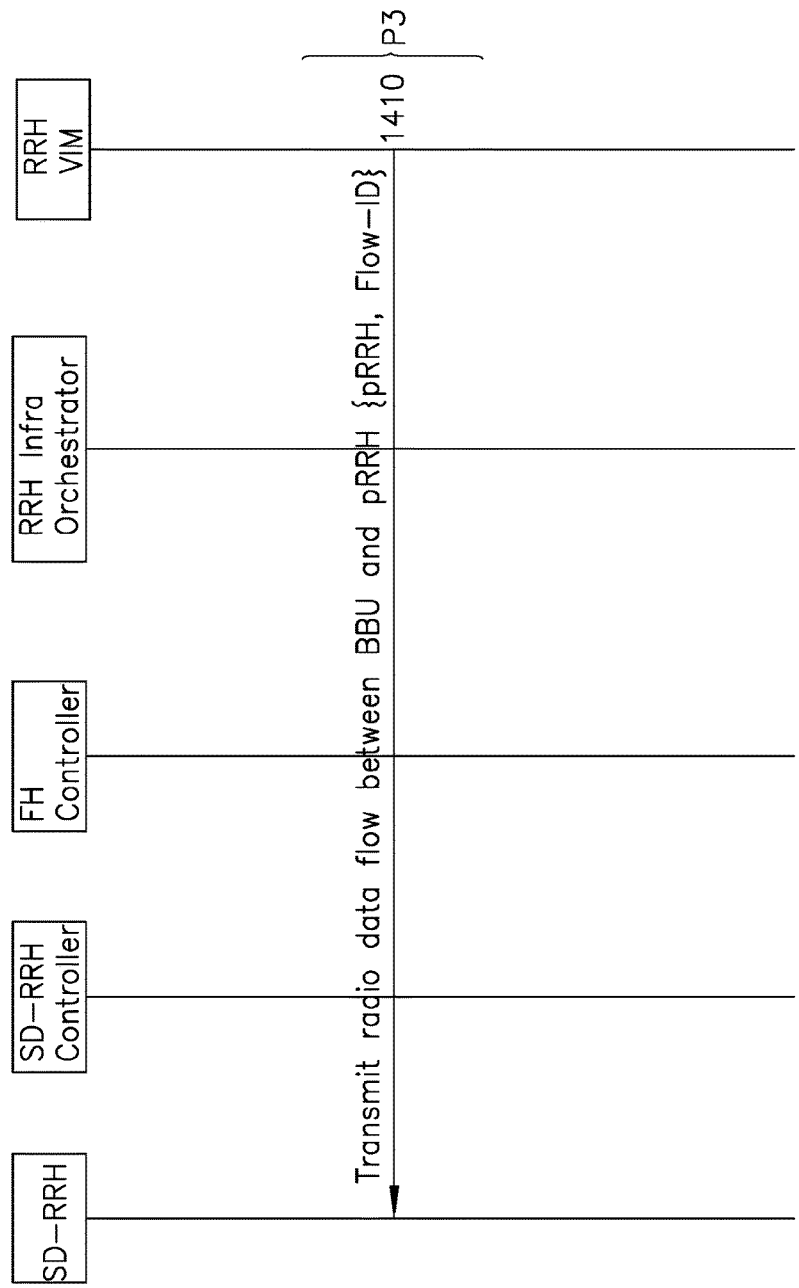

Referring concurrently to FIGS. 13 and 14, which respectively show an exemplary embodiment of a second and a third phase of a radio service provisioning in accordance with some exemplary embodiments of the present disclosure.

During the phase P2 (i.e. P2-1 and P2-2 shown in FIG. 13), the RRH VM establishes connection with the vRRH. The RRH VM then sends out a connect request to vRRH by using NB-Intf. The SD-RRH controller then performs mapping between the vRRH and the pRRH, wherein the vRRH is represented by {vRRH-ID}, while the pRRH is represented by {pRRH Slice-ID} or {Tx/Rx SigPath-ID}. The SD-RRH controller then configures the pRRH with a SB-Intf. The RRH controller the returns a connect result back to the RRH VM. The detail processes of phase P2 resemble substantially comparable to that depicted in FIG. 7 (and the corresponding description), and therefore will not be further discussed for the brevity of disclosure.

Following the setup of a radio data flow between the RRH VM and the pRRH, the process proceeds to the phase P3 (as shown in FIG. 14), in which data communication is enabled between the RRH VM in a particular C-RAN domain and the pRRH in the Shared RRH pool. Specifically, the RHH VM is able to start a radio data flow between itself and the pRRH (which terminates phase P3). The detail processes of phase P3 resemble substantially comparable to that depicted in FIG. 8 (and the corresponding description), and therefore will not be further discussed for the brevity of disclosure.

Figure 15:
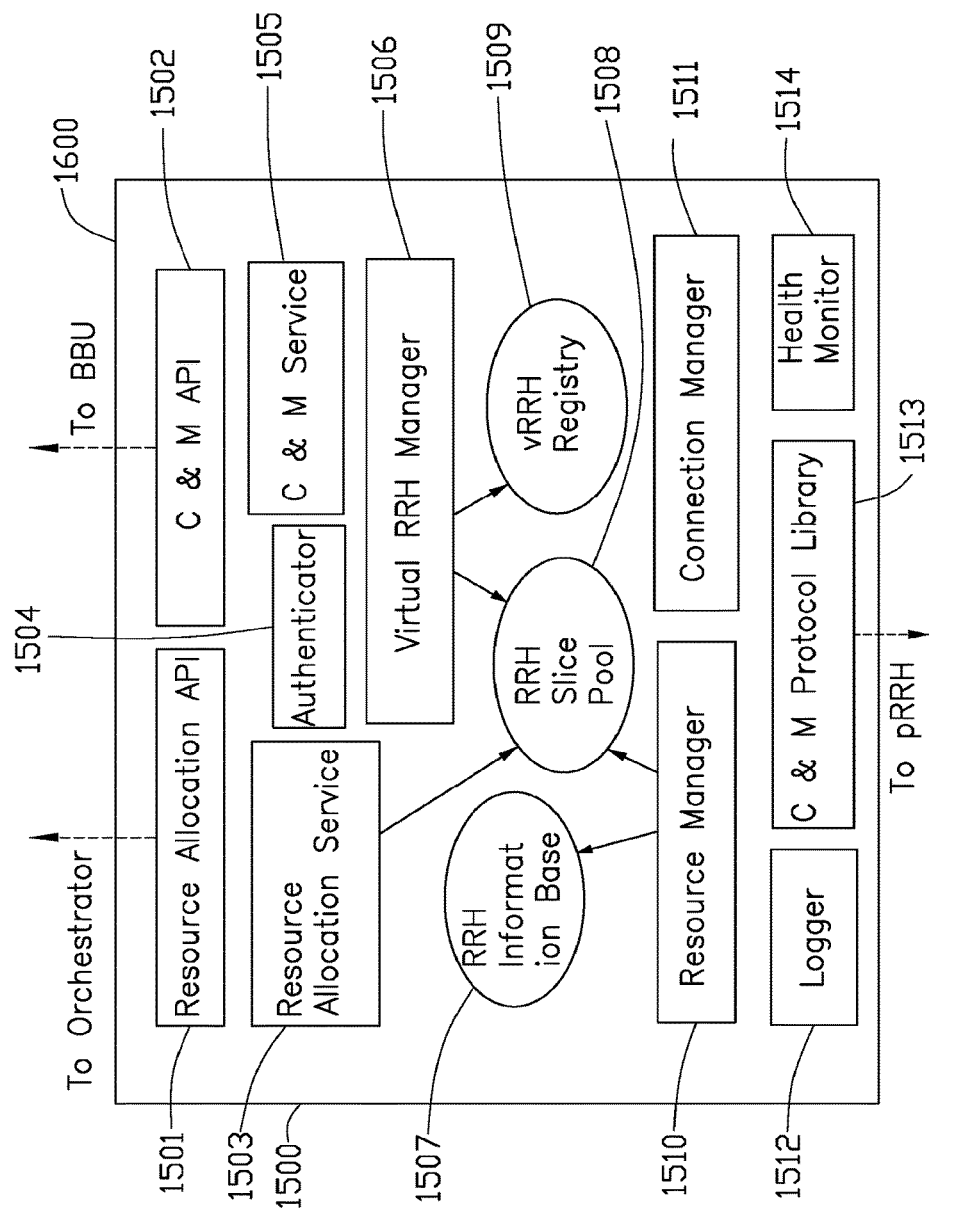
FIG. 15 illustrates architecture of an exemplary SD-RRH controller.

FIG. 15 illustrates an exemplary embodiment of a architecture of an SD RRH controller in accordance with exemplary embodiments. The exemplary SD-RRH controller 1500 can be used for implementing the SD-RRH controller 242 in FIG. 2.

The exemplary SD-RRH controller 1500 communicates with an orchestrator (e.g. orchestrator 241), a BBU (e.g. BBU 221a/b), and physical RRH (e.g. shared RRH pool 21). In FIG. 15, solid connection lines indicate physical network connections (which may be wired or wireless), dashed connection lines represent software interfaces (and any corresponding hardware implementations).

The exemplary SD-RRH controller 1500 slices the physical RRH resources into multiple slices, so as to create software defined virtual RRHs using a single or multiple SD-RRH slices. The SD-RRH controller 1500 allocates RRH resources according to OSS/BBU requests, and configures pRRHs.

The exemplary SD-RRH controller 1500 comprises software defined multiple function modules, which include at least a resource allocation application program interface (resource allocation API) 1501, a control and management (C&M) API 1502, a resource allocation service (RAS) 1503, an authenticator 1504, a C&M service 1505, a vRRH manager 1506, an RRH Information Base (RIB) 1507, an RRH slice pool 1508, a vRRH registry 1509, a resource manager 1510, a connection manager 1511, a logger 1512, a C&M protocol library 1513, and a health monitor 1514. In at least one exemplary embodiment, the SD-RRH controller 1500 may be implemented by a processor and/or a memory, wherein the processor can execute and implement at least the above function modules.

The resource allocation API 1501 is coupled to an orchestrator (e.g. orchestrator 241) through software interface. The C&M API 222 is coupled to a BBU (e.g. BBU 221a/b). The RAS 1503 is coupled to the RRH slice pool 1508. The vRRH manager 1506 is coupled to the RRH slice pool 1508 and the vRRH registry 1509. The resource manager 1510 is coupled to the RRH Information Base 1507 and the RRH slice pool 1508. The C&M protocol library 1513 is coupled to a physical RRH (e.g. shared RRH pool 21).

The resource allocation API 1501 is configured to provide a first set of remote procedure calls (RPCs) (e.g. through RESTCONF) such that an external application (e.g. orchestrator 241) can invoke to perform RRH resource allocation/de-allocation remotely and programmatically. The C&M API 1502 is configured to provide a second set of RPCs (e.g. through RESTCONF) such that external application (i.e., the BBU 221a/b) can invoke to perform control and management operations remotely and programmatically for controlling the operation of an SD-RRH based on the request from the BBU.

In at least one exemplary embodiment, the C&M API 1502 may be implemented based on ORI C&M Protocol (OCP), and may define the following C&M operations: 1) health-check, set-time, re-reset; 2) get-param, modify-param; 3) get-state, modify-state; 4) get-fault; and 5) create-obj, delete-obj. The RAS 1503 is the concrete implementation of the resource allocation API 1501. The RAS 1503 is configured to specifically handle the creation/release of the vRRH resource.

The authenticator 1504 is configured to provide authentication functionality. The API calls require authentication by default. The default method is to use basic authentication with a user name and password. The C&M service 1505 is another concrete implementation of the C&M API 1502. The Implementation of a C&M API 1502 may result in one or multiple invocations on the functions contained in the C&M protocol library 1513. The virtual RRH manager 1506 is configured to provide a layer of abstraction that tracks/recalls the mapping of a vRRH(s) to its corresponding pRRH(s). The resource manager 1510 provides lifecycle management of registered RRH devices and presents a global view of RRH resources available at any given time upon request. The connection manager 1511 is configured to be responsible for all aspects of session management. The connection manager 1511 generates a session management layer that creates and maintains C&M sessions.

The logger 1512 is used to record messages from different log-generating sources, e.g., SD-RRH controller 1500 and RRH hardware/software components for monitoring the operations of the SD-RRH controller 1500 and the pRRH. The logger 1512 further unifies collection, storage, and analysis of logs for intelligence. The C&M protocol library 1513 is a component in SD-RRH controller 1500 that mediates communication between SD-RRH controller 1500 and SD-RRHs supporting the C&M protocol. Its primary goal is to provide the C&M service with communication channel that can be used for managing SD-RRHs.

The health monitor 1514 is configured to provide health status information of the RRH network hardware by monitoring, alerting, and reporting over the status of managed (registered) pRRH devices, so as to maintain the SD-RRH operations.

In at least one exemplary embodiment, the SD-RRH controller 1500 initiates the operation of creating one or more vRRHs via slicing technique upon receiving an RRH allocation request from an orchestrator (e.g. orchestrator 241) in response to receiving the RRH resource allocation requested from the BBU (e.g. BBU 221a/b). In the exemplary embodiment, the resource allocation API 1501 of the SD-RRH controller 1500 dispatches the RRH allocation request to the RAS 1503 and the RAS 1503 performs RRH slicing operation and allocates necessary RRH slice(s) to serve the RRH allocation request. The RAS 1503 sends RRH slice(s) allocation information to the vRRH manager 1506 to create a mapping between vRRH(s) and pRRH(s) (i.e. vRRH(s) and pRRH(s) mapping). The vRRH manager 1506 returns the corresponding vRRH ID back to the orchestrator.

When the BBU issues a termination request to the orchestrator for terminating the session and release the RRH resources, the orchestrator outputs the termination request to the resource allocation API 1501 of the SD-RRH controller 1500. The resource allocation API 1501 subsequently dispatches the termination request to the RAS 1503. The RAS 1503 issues a corresponding resource release request to the vRRH manager 1506, and the vRRH manager 1506 then releases the vRRH resources allocated for the BBU.

The BBU may also issue the request to the orchestrator to cause the SD-RRH controller 1500 to re-configure the vRRH resource based on user application requirements. In at least one exemplary embodiment, the C&M API 1502, the C&M service 1505, communicate with the C&M protocol library of the SD-RRH controller 1500 to perform the corresponding vRRH resource configuration operations.

Figure 16:
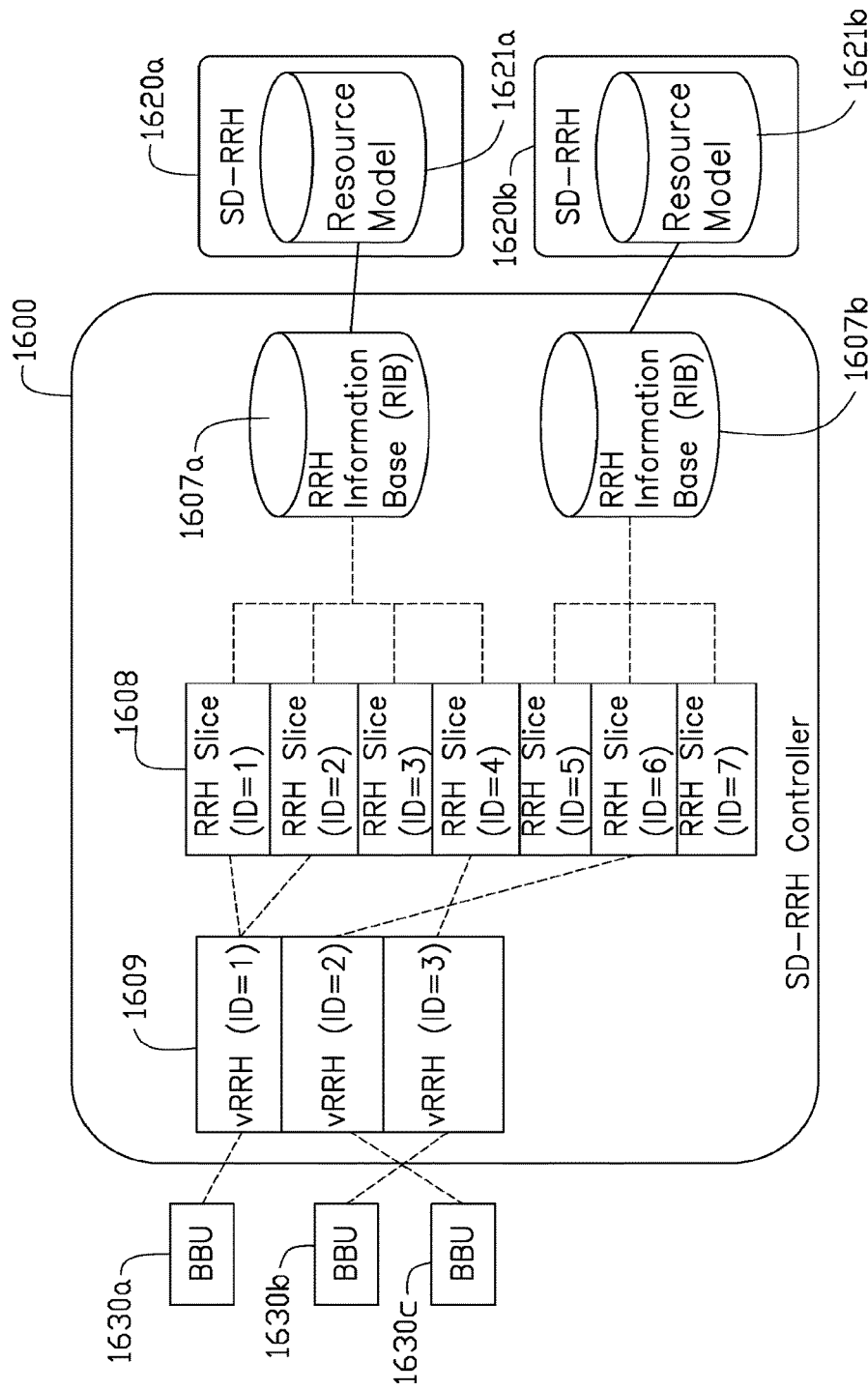
FIG. 16 shows a diagram illustrating an exemplary embodiment of a vRRH to pRRH mapping operation of an exemplary SD-RRH controller.

Please refer to FIG. 16, which shows a diagram illustrating a vRRH to pRRH mapping operation of a SD-RRH controller in accordance with some embodiments of the present disclosure. In the illustrated exemplary embodiment, the slicing operation may be implemented by the SD-RRH controller 1500 of FIG. 15. The solid connection lines indicates physical network connections (which may be wired or wireless), while the dashed connection lines represent software interfaces (and the corresponding hardware implementations thereof).

Resource models 1621*a* and 1621*b* are created on SD-RRHs 1620*a* and 1620*b*, respectively, representing running configuration and status of the device itself. RRH Information Bases (RIBs) 1607*a*, 1607*b* on the SD-RRH controller 1600 are configured to store all relevant information of physical RRHs (i.e. SD-RRHs 1620*a* and 1620*b*) that are registered to the SD-RRH controller 1600.

A vRRH registry 1609 is configured to contain one or more vRRH entries, and each of which describes a vRRH that is currently in use (i.e., allocated to the respective BBU 1630*a*, 1630*b*, or 1630*c*). Each set of vRRH allocated are assigned with a unique ID number (e.g., ID=1, 2, 3) as the identification for the data flow link. The unique ID number for each set of vRRH generated after RRH resource allocation process is returned to the BBU for subsequent data communication and/or vRRH configuration operations. In the illustrated exemplary embodiment, any vRRH released after the session should be removed from the vRRH registry 1609 and only the virtual RRH manager (e.g. virtual RRH manager 1506 in FIG. 15) has access to the vRRH registry 1609.

A RRH slice pool 1608 is a collection of RRH slices (e.g. RRH slices ID=1, 2, 3, 4, 5, 6, 7) created in correspondence to different pRRHs, wherein each RRH slice entries is also assigned with a corresponding ID number for later reference. Some of the RRH slices in the RRH slice pool 1608 may be in use (i.e., have been allocated to vRRHs), while others may be idle (i.e., not yet been allocated) and available for later use. The RRH slice pool 1608 may be accessed by several software modules in SD-RRH controller 1600, and the software-defined (SD) function modules may at least include the resource manager (e.g. resource manager 1510 in FIG. 15), the RAS (e.g. RAS 1503 in FIG. 15), the virtual RRH manager (e.g. virtual RRH manager 1506 in FIG. 15), the vRRH registry 1609.

In short, the SD-RRH controller through software defined function modules such as the RIB, RRH slice pool, the resource manager, the RAS, the virtual RRH manager, the vRRH registry can dynamically perform vRRH to pRRH mapping and RRH slicing operation according to the user application and/or operation requirements. The vRRH to pRRH mapping may be recorded in a form of table for resource monitoring and managing operation. The table in at least one exemplary embodiment may contain the information such as vRRH ID number, RRH slice ID number, vRRH to pRRH mapping relationships, the BBU ID number, allocation session duration.

Figure 17:
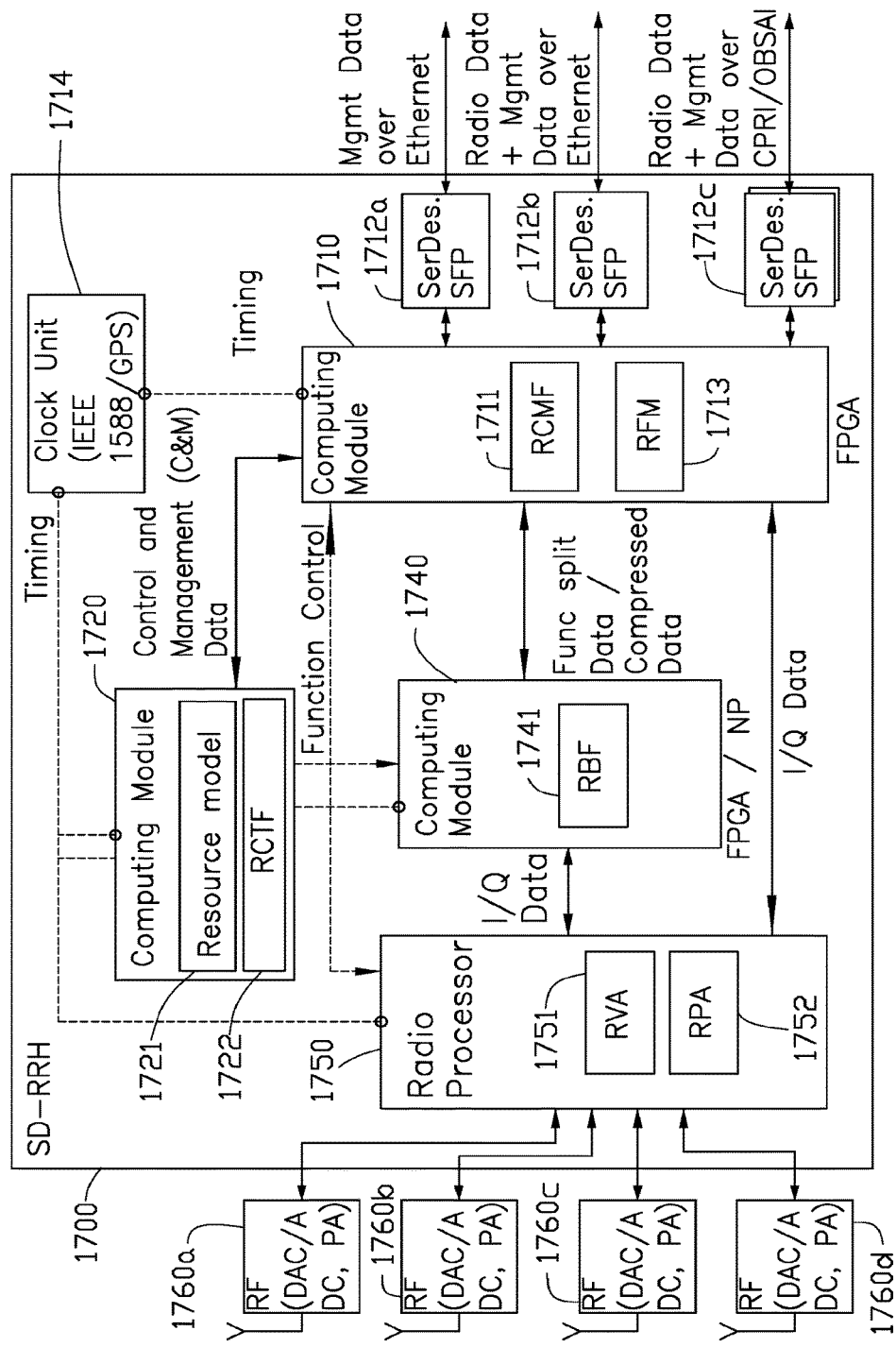
FIG. 17 shows an exemplary embodiment of the architecture of an exemplary SD-RRH.

Please refer to FIG. 17, which shows a diagram illustrating an exemplary embodiment architecture of a SD-RRH in accordance with some exemplary embodiments of the present disclosure. A SD-RRH 1700 is communicatively coupled to a SD-RRH controller (not shown in FIG. 17) and a BBU (not shown in FIG. 17). The SD-RRH 1700 is controlled by the SD-RRH controller. The SD-RRH 1700 includes a SD-RRH communication module 1710, SD-RRH communication interfaces 1712*a-c*, a clock unit 1714, a SD-RRH control module 1720, a SD-RRH computing module 1740, a radio processor 1750, and the RF front-end and antenna ports 1760*a-d*. The SD-RRH communication module 1710 is electrically coupled to the SD-RRH communication interfaces 1712*a-c*, the clock unit 1714, the control module 1720, the SD-RRH computing module 1740. The SD-RRH control module 1720 is electrically coupled to the clock unit 1714, the SD-RRH communication module 1710, the SD-RRH computing module 1740, and the radio processor 1750. In FIG. 17, the solid connection lines indicate physical network connections (which may be wired or wireless), while the dashed connection lines represent software interfaces (and the corresponding hardware implementations thereof).

In at least one exemplary embodiment, the SD-RRH control module 1720, the SD-RRH communication module 1710, the computing module 1740, and the radio processor 1750 may be implemented by a FPGA.

The clock unit 1714 is configured to perform time synchronization between the BBU and the SD-RRH it is linked to. The clock unit 1714 may be configured to output IEEE 1588/GPS data.

The SD-RRH communication interfaces 1712*a-c* may comprise of different transmission protocol such as CPRI/OBSAI or Ethernet. The SD-RRH communication interfaces 1712*a-c* may comprise a number of connection ports corresponding to different type of protocols for performing various type of data transmission between the BBU and the SD-RRH 1700.

The SD-RRH communication module 1710 may comprise of a software-defined RRH communication function module (RCMF) 1711 and a software-defined RRH flow manger (RFM) 1713 for receiving data sent from a BBU (Not shown in FIG. 17). The SD-RRH communication module 1710 may have multiple instances of RCMF 1711, wherein each instances of RCMF 1711 may be dynamically configured to support different types of fronthaul transport protocol, such as CPRI/OBSAI link, Ethernet-based Signal Path (e.g. 1904.3 RoE), at same time for parallel transmission.

The RCMF 1711 can extract user data and C&M data received from transport flow initiated by the BBU linked to the SD-RRH 1700. When the RCMF 1711 determines that the extracted user data contains functional-split and/or compression data, the RCMF 1711 dispatches the user data to the SD-RRH computing module 1740 for further data processing. When the RCMF 1711 determines that the user data is I/Q data, the RCMF 1711 sends the user data directly to the radio processor 1750. The radio processor 1750 then performs necessary data transmission and drives the RF front-end and antenna ports 1760a-d to transmit user data to the corresponding user device. The RCMF 1711 further dispatches the extracted C&M data to the SD-RRH control module 1720 for further performing corresponding system and network configuration operations.

The RRH flow manager (RFM) 1713 is software-configured to manage traffic flow for different types of protocol communications, e.g. CPRI, RoE, and NFP (New Fronthaul Protocol), between the SD-RRH 1700 and the BBU based on the assigned data flow. The RFM 1713 can manage different carrier (IQ data) or transport (Non-IQ data) flows and dispatch these data to proper function module for corresponding data processing. In the exemplary embodiment, each traffic flow is identified with a unique flow ID. The flow ID space is locally defined in accordance to the same DS/SA pairs, e.g. the SD-RRH and the respective BBU. The flow information is generated by an external traffic flow management function module and provided to the RFM 1713.

The SD-RRH control module 1720 may comprise a RRH control function (RCTF) 1722 and a resource model 1721 of virtual RRH and RRH slice. The RRH control function of the SD-RRH control module 1720 is configured to communicate with a SD-RRH controller through ORI C&M Protocol (OCP) and process the C&M command received from the SD-RRH controller. The RCTF 1722 further configures other function modules in the SD-RRH 1700 according to the C&M data received from the SD-RRH controller.

In the illustrated exemplary embodiment, the RCTF 1722 uses the resource model 1721 to represent SD-RRH configuration and performs RRH slicing operation. The resource model 1721 may comprise of a radio equipment (RE) object, Tx/Rx signal path (SigPath) object, a data plane link object, an Ethernet data link object, and CPRI data link object. The RE object is designed to create resource allocation denominator. The Tx/Rx SigPath object is designed to generate path signatures by creating flow id assignment, the physical antenna port assignment, and physical data link port assignment, MAC address/IP address/UDP port assignment. The data plan link object is designed to provide link instantiation for different type of links (CPRI or Ethernet) and link path to MAC/IP address if the type of link is Ethernet.

Moreover, a resource allocation numerator (RAN) and a resource allocation denominator (RAD) are used for segmenting physical RRH resources into slices to form vRRH. In one exemplary embodiment, if the denominator is set to 6 while the numerator of a RRH slice-1=1 indicates that the RRH slice-1 is allocated with ⅙ RRH resource (as shown in Table 1).

TABLE 1

| vRRH-ID | Slice (RAN/RAD) | RCMF-ID | RFM-ID | RBF-ID | RVA-ID | RPA-ID |
|---|---|---|---|---|---|---|
| 1 | 1 (1/6) | 1 | 1 | 1 | 1 | 1 |
| 2 | 2 (1/6) | 2 | 2 | 2 | 2 | 2 |
| 2 | 3 (1/6) | 3 | 2 | 3 | 3 | 3 |
| 3 | 4 (1/6) | 4 | 3 | N/A | 4 | 3 |
| 3 | 5 (1/6) | 5 | 3 | 4 | 5 | 4 |
| 3 | 6 (1/6) | 6 | 3 | 5 | 6 | 4 |

Figure 24:
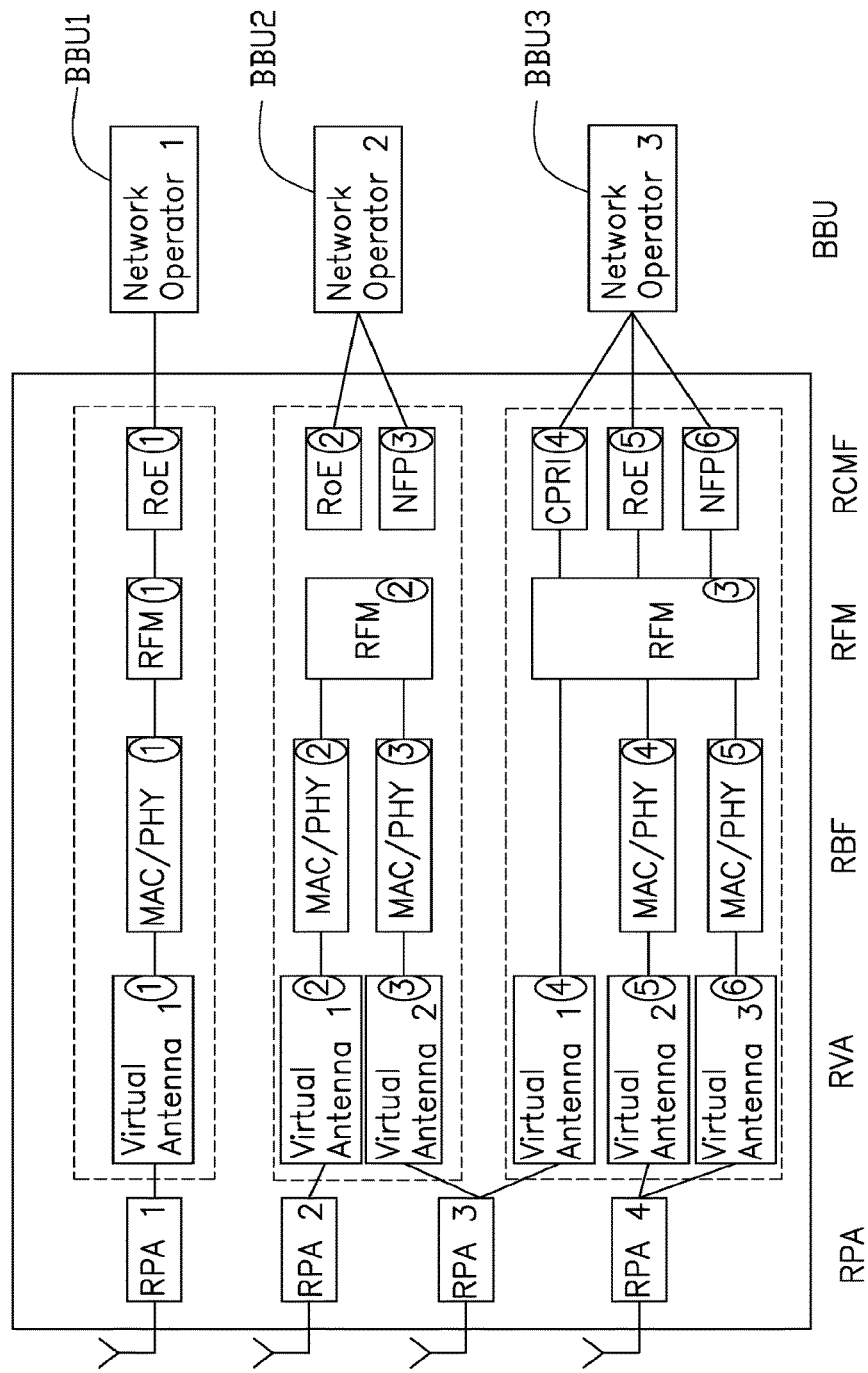
FIG. 24 illustrates a scenario of a resource model for a RRH slice and virtual RRH according to exemplary embodiments.

Referring to FIG. 24, which illustrates an exemplary embodiment of a scenario of a resource model for RRH slice and virtual RRH. An exemplary SD-RRH resource model in FIG. 24 for creating virtual RRHs with single or multiple RRH slices can be represented by: vRRH-1 {RRH-Slice-1}, vRRH-2 {RRH-Slice-2, 3}, vRRH-3 {RRH-Slice-4 5, 6}, wherein vRRH-1 {RRH-Slice-1} represents that vRRH-1 corresponding to one RRH slice; vRRH-2 {RRH-Slice-2, 3} represents that vRRH-2 corresponding to two RRH slices; vRRH-3 {RRH-Slice-4 5, 6} represents that vRRH-3 corresponding to three RRH slices. In FIG. 24, the numbers in a circle (e.g. ①, ②, ③, ④, ⑤, ⑥) denote module ID that are contained in each RRH slice.

In FIG. 17, the SD-RRH computing module 1740 may comprise a RRH base band function (RBF) 1741 for performing base band signal processing. The RBF 1741 can be software-defined to convert functional split and/or data compression to and from I/Q data. The converted IQ data is further sent to the radio processor 1740 for further processing e.g., preparation of data stream to be transmitted. Multiple instances of the RBF 1741 can be created in the SD-RRH computing module 1740 in such a manner that the SD-RRH computing module 1740 can be dynamically configured to support different types of functional split or data compression at same time.

The radio processor 1750 comprises a RRH Virtual Antenna Port (RVA) 1751, and RF front-end and antenna port (RPA) 1752. The RVA 1751 is configured to support operations, including but is not limited to, sample rate conversion (SRC), digital up-converter (DUC), digital down-converter (DDC), crest factor reduction (CFR), and digital pre-distortion (DPD). Multiple instances of the RVA 1751 can be created in the radio processor 1750 in such manner that the RVA 1751 can be dynamically configured to work with different air technologies (e.g. 3G, LTE, 5G). The RPA 1752 is configured to execute functions required to perform data transmission and reception operations through physical antennas, such as ADC, DAC, and any other analog RF functions. The RPA 1752 can be shared by multiple RVAs 1751. The RVA 1751 segments physical antenna functions into antenna slices, and uses single or multiple antenna slices to create virtual antenna port (or array antenna). For instance, the RPA 1752 in one exemplary embodiment may be configured with specific frequency and bandwidth that can be segmented into slices and shared by multiple RVAs 1751. The RVA 1751 is further configured to create virtual antenna ports based on service and application requirements, such as information contained in RRH profile, which may include but not limited to air-interface, frequency, channel bandwidth, location, antenna-topology. Moreover, physical antenna and RF resources can be shared by different virtual antenna ports.

FIGS. 18-23 show an exemplary embodiment of an operational process flows of a radio access network system in accordance with some exemplary embodiments of the present disclosure.

Figure 18:
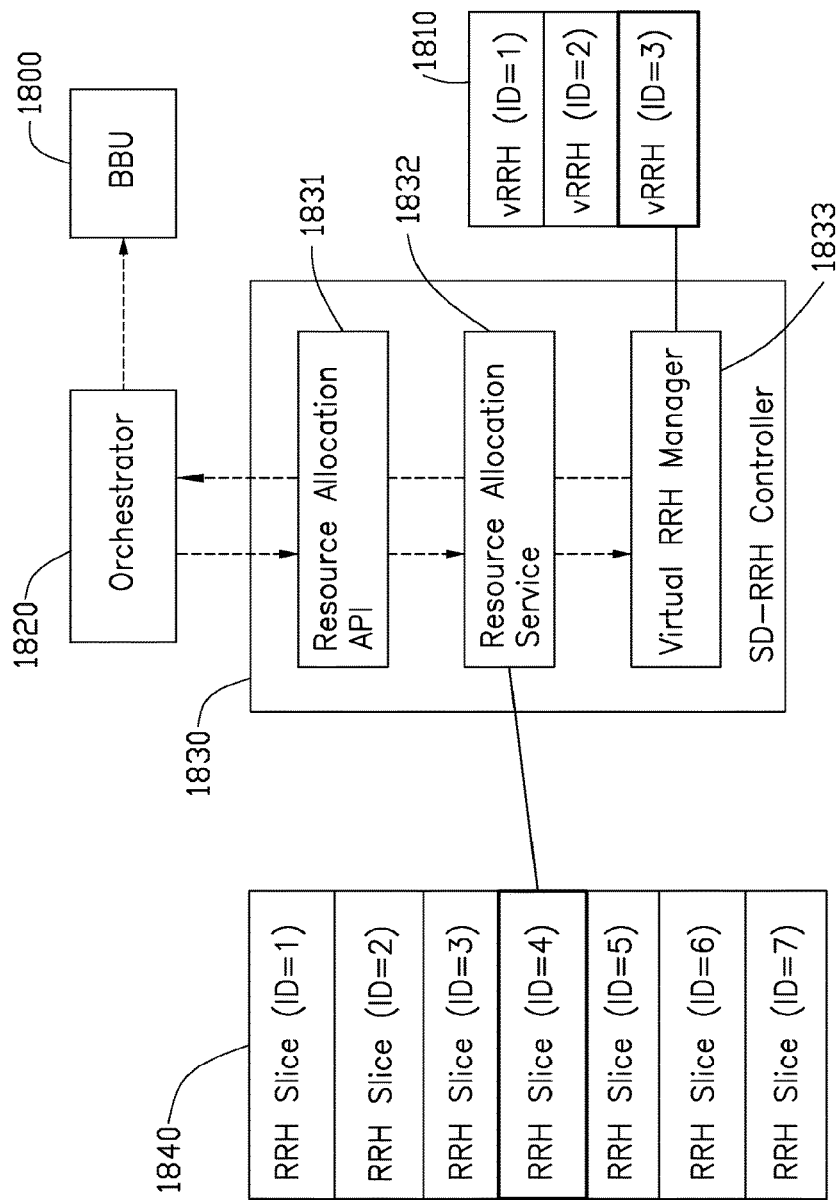
FIGS. 18-23 show operational process flows of an exemplary radio access network system in accordance with some embodiments.
Figure 19:
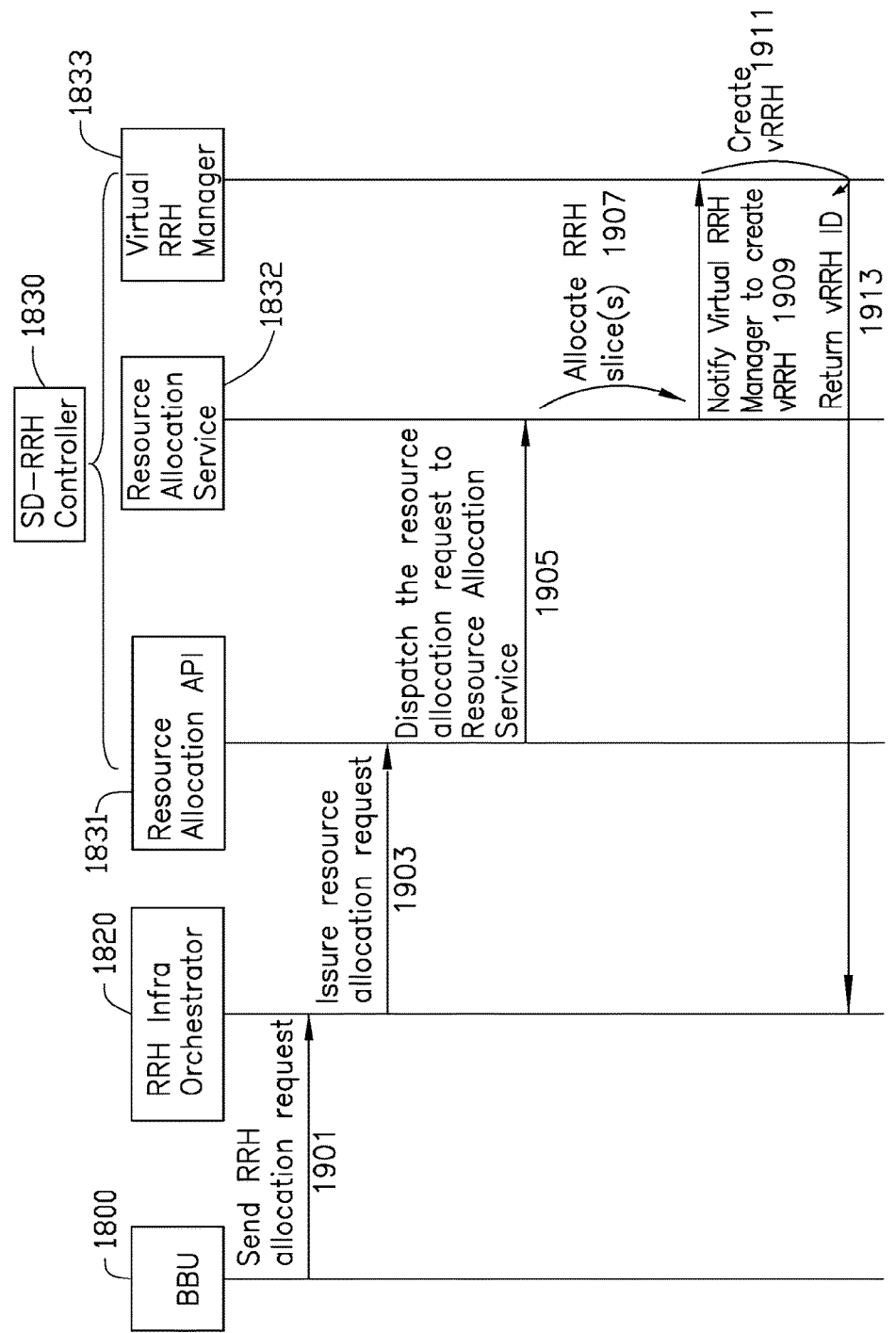

FIG. 18 shows a schematic diagram illustrating a virtual RRH establishing operation for a radio access network in accordance with some embodiments of the present disclosure. FIG. 19 shows an operational process flow illustrating a virtual RRH establishing operation for a radio access network in accordance with some embodiments of the present disclosure.

A BBU 1800 requests RRH resources from a RRH Infra orchestrator 1820. The RRH Infra orchestrator 1820 forwards the request to a SD-RRH controller 1830 for allocating RRH resources forming vRRH, accordingly. The SD-RRH controller 1830 illustrated exemplary embodiment may have similar architecture as the SD-RRH controller 1500 of FIG. 15.

Please refer to FIG. 18 and FIG. 19 together. In process 1901, the BBU 1800 issues a RRH allocation request to the RRH Infra Orchestrator 1820. The BBU 1800 may transmit a BBU/RRH/FH profile to the RRH infra Orchestrator 1820 to request resource allocation of the RRH. A RRH profile describing service requirements of the RRH resources (such as air-Interface, frequency, bandwidth, location, antenna-topology, function split, compression, and transport protocol) is created. A FH profile describing service requirements of fronthaul network resources (such as Bandwidth, QoS) is also generated. A BBU profile describing attributes of BBU (such as BBU-ID and address, and contains information that will be required to create a radio data processing graph (e.g., the RRH-PG) and set up a radio data flow) is also created during this process.

In process 1903, the RRH Infra Orchestrator 1820 issues the resource allocation request to the SD-RRH controller 1830 by transmitting corresponding specific commands to the SD-RRH controller 1830 to perform RRH resource allocation operation. In process 1905, a resource allocation API 1831 of the SD-RRH controller 1830 upon receiving the specific command from the RRH Infra Orchestrator 1820, dispatches the resource allocation request to a resource allocation service 1832 of the SD-RRH controller 1830.

In process 1907, the resource allocation service 1832 allocates RRH slices (e.g., RRH slice ID=4) from a RRH slice pool 1840 (not shown in FIG. 19), accordingly. The RRH slice pool 1840 is a collection of RRH slices (ID=1-7) created in correspondence to different physical RRHs, wherein each RRH slice entries is also assigned with a corresponding ID number for later reference.

In process 1909, the resource allocation service 1832 notifies a vRRH manger 1833 to create vRRH mapping based on the pRRH resource. In process 1911, the virtual RRH manager 1833 allocates and creates vRRH by accessing the vRRH registry 1810 (not shown in FIG. 19). The vRRH registry 1810 contains one or more vRRH entries created, and each of which describes a vRRH that is currently in use. Each set of vRRH allocated are assigned with a unique ID number (e.g., ID=1, 2, 3) as the identification for the data flow link. In process 1913, the virtual RRH manager 1833 returns the corresponding vRRH ID (e.g., ID=3) to the RRH Infra Orchestrator 1820 indicates that the RRH resource allocation is completed.

Figure 20:
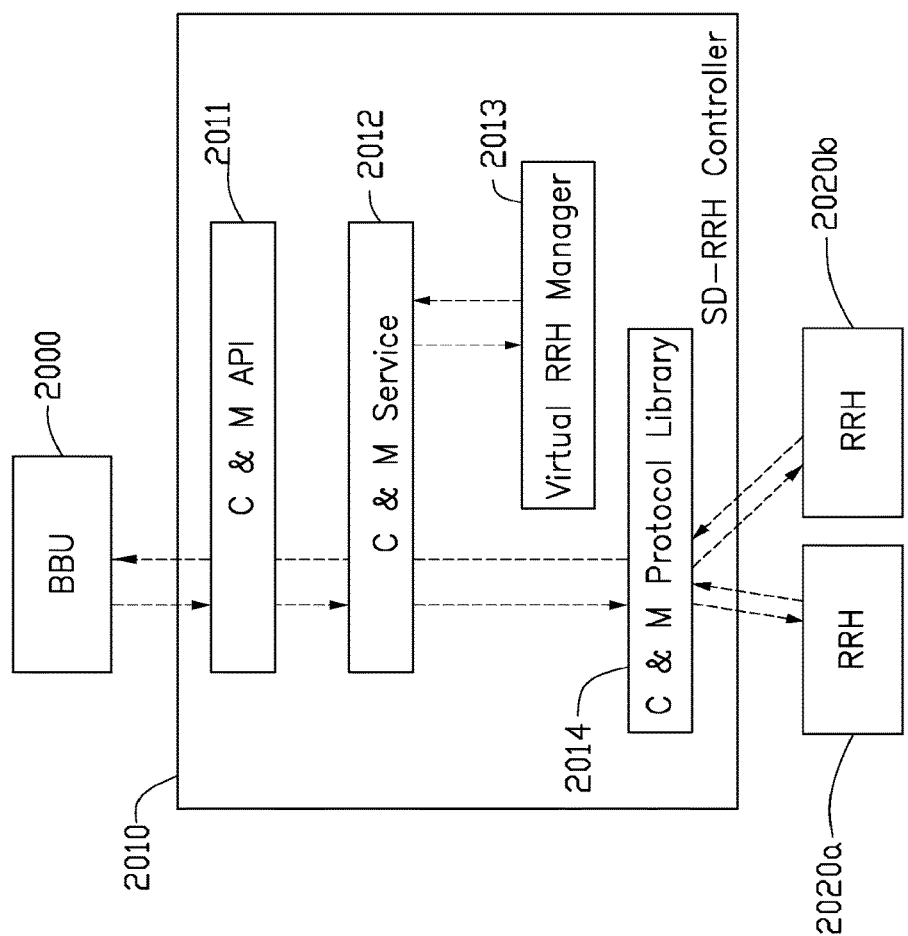
Figure 21:
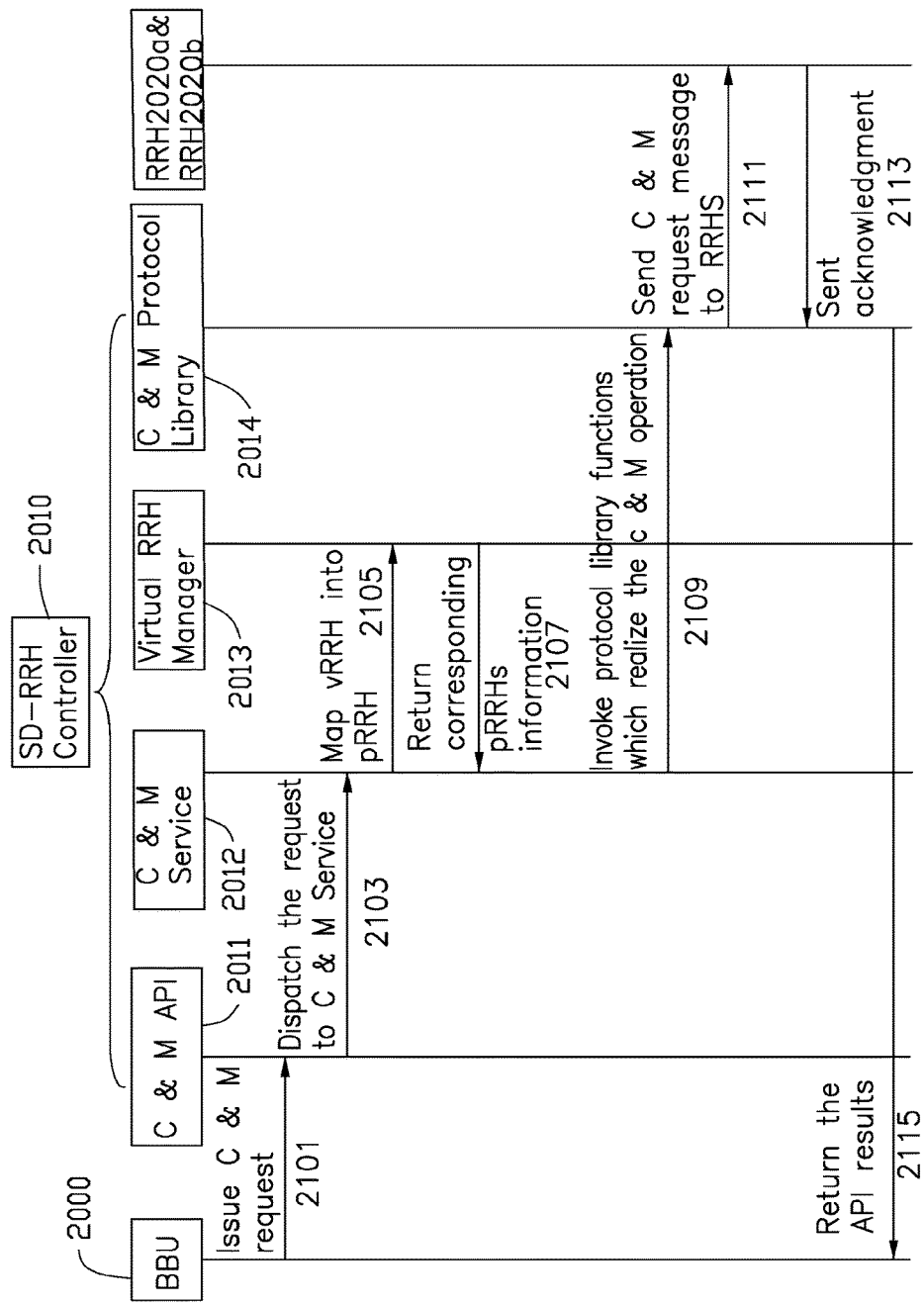

FIG. 20 is a schematic diagram illustrating a virtual RRH manipulation operation for a radio access network in accordance with some embodiments of the present disclosure. FIG. 21 shows an operational process flow illustrating a virtual RRH manipulation operation for a radio access network in accordance with some embodiments of the present disclosure. In FIG. 20, a BBU 2000 may issue a C&M request to initiate re-configuration process when the BBU 2000 wants to re-configure or manipulate the vRRH resource setting.

Please refer to FIG. 20 and FIG. 21 together. In process 2101, the BBU 2000 issues a C&M request to configure vRRH allocated from two pRRHs.

In process 2103, a C&M API 2011, upon receiving the C&M request, initiates the vRRH configuration process and dispatches the C&M request to a C&M service 2012.

In process 2105, the C&M service 2012 retrieves the corresponding vRRH mapping information from the virtual RRH manager 2013 to obtain the corresponding pRRH information.

In process 2107, the virtual RRH manager 2013 returns the corresponding pRRH information to the C&M service 2012.

In process 2109, the C&M service 2012 accesses the C&M protocol library 2014 and calls a protocol library function, which is capable of realizing the C&M operation.

In process 2111, the C&M protocol library 2014 sends the C&M request message to RRHs 2020 (i.e., the RRH 2020a and the RRH 2020b), at the same time.

In process 2113, the RRHs 2020 re-configure the RRH configuration setting accordingly, and send acknowledgements back to the C&M protocol library 2014.

In process 2115, the C&M protocol library 2014 returns the API result to the BBU 2000 to notify the BBU 2000 that the RRH re-configuration process is completed and reports the corresponding status.

Figure 22:
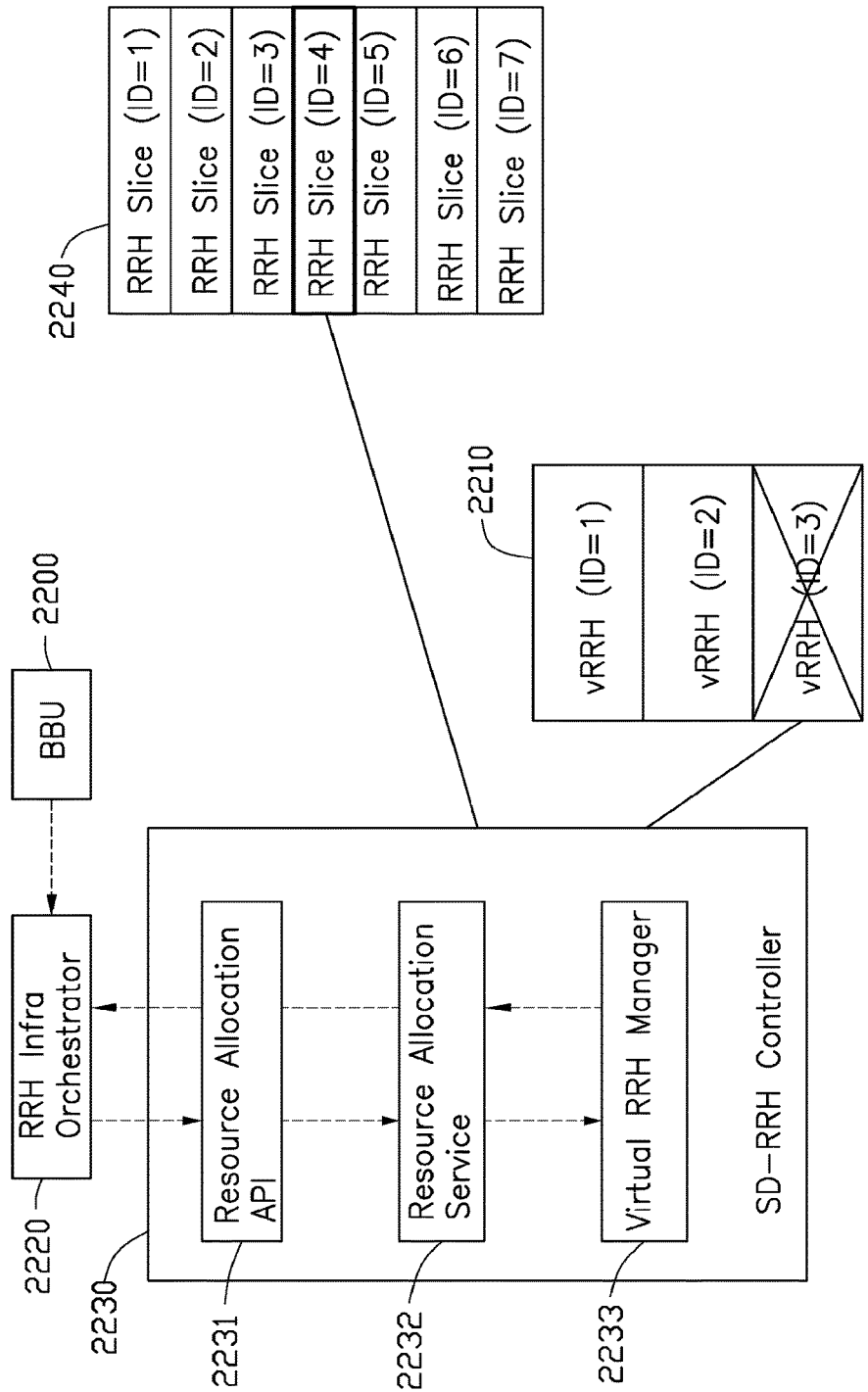
Figure 23:
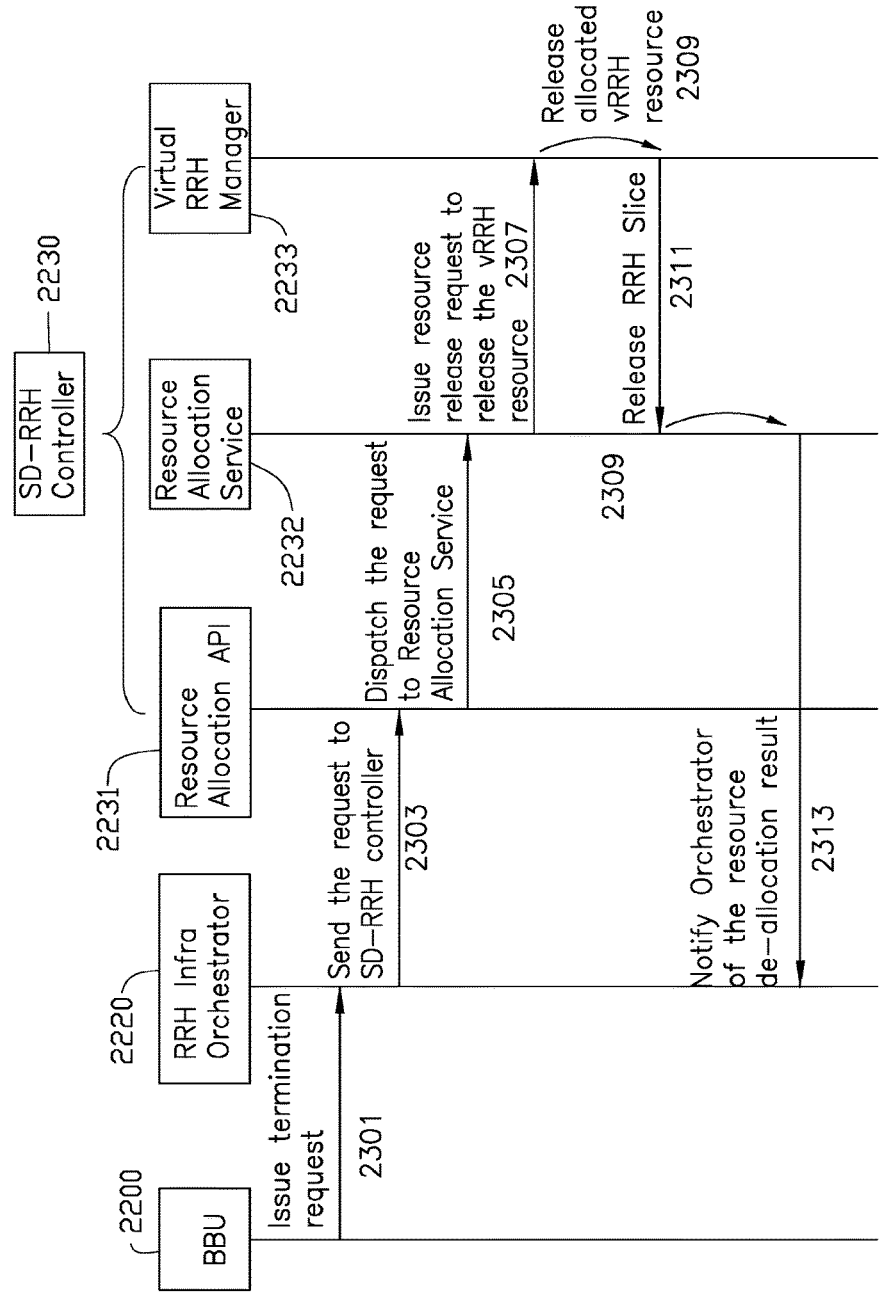

FIG. 22 is a schematic diagram illustrating a virtual RRH termination operation for a radio access network in accordance with some embodiments of the present disclosure. FIG. 23 shows an operational process flow for a virtual RRH termination operation for a radio access network in accordance with some embodiments of the present disclosure.

In FIG. 22, a BBU 2200 can initiate the termination process by issuing a termination request to an RRH Infra Orchestrator 2220 for terminating the session and releasing the RRH resources when the BBU 2200 decides to terminate the vRRH allocation session.

In process 2301, the BBU 2200 issues a termination request to the RRH Infra Orchestrator 2220.

In process 2303, the RRH Infra Orchestrator 2220 issues the termination request to SD-RRH controller 2230. In the illustrated exemplary embodiment, the RRH Infra Orchestrator 2220 forwards the termination request in terms of C&M commands to the resource allocation API 2231 of the SD-RRH controller 2230.

In process 2305, the resource allocation API 2231 dispatches the termination request to a resource allocation service 2232.

In process 2307, the resource allocation service 2232 issues a corresponding resource release request to the virtual RRH manager 2233 to notify the virtual RRH manager 2233 to release the specific vRRH resource (i.e. the vRRH allocated to the BBU 2200) by removing the vRRH resource from the vRRH registry 2210 (e.g., vRRH ID=3, not shown in FIG. 23).

In process 2309, the virtual RRH manager 2233 notifies the resource allocation service 2232 that the vRRH resource has been released.

In process 2311, the resource allocation service 2232 releases the corresponding RRH slice (e.g., RRH slice ID=4) from the RRH slice pool 2240 (not shown in FIG. 23) to release the RRH slice.

In process 2313, the resource allocation service 2232 notifies the RRH Infra Orchestrator 2220 of the RRH resource de-allocation result.

On the whole, the exemplary SD-RRH controller slices the physical RRH resources into multiple slices, so as to create software defined virtual RRHs using a single or multiple SD-RRH slices. Each virtual RRH can have different configuration to fulfill distinct network service requirements.

The exemplary embodiments shown and described above are only examples. Many details are often found in the art such as the other features of a camera module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A network infrastructure for a wireless communication system, the infrastructure comprising:
   a fronthaul network for managing fronthaul resources, the fronthaul network comprising a fronthaul controller;
   an RRH pool coupled to the fronthaul network for providing remote radio head (RRH) resources; and
   a radio service chain (RSC) coupled to the fronthaul network and the RRH pool for allocating the RRH resources, the RSC comprising:
      an orchestrator coupled to the fronthaul controller, and at least one cloud radio access network (C-RAN), for receiving a radio resource request from the at least one C-RAN and converting the radio resource request into a RRH specific command; and
      a remote radio head (RRH) controller coupled to the orchestrator for slicing the RRH resources to create virtual RRHs according to the RRH specific command received from the orchestrator.

2. The network infrastructure of claim 1, wherein the orchestrator further creates a radio data process graph according to the radio resource request, converts the radio data process graph into the RRH specific command, and sends the RRH specific command to the RRH controller.

3. The network infrastructure of claim 1, wherein the RRH controller creates a mapping between the virtual RRHs and physical RRH, converts a profile setting of the virtual RRHs into configurations of the physical RRHs, and applies the configurations of the physical RRH to the physical RRHs.

4. The network infrastructure of claim 3, wherein the physical RRHs set up RRH internal units according to the configurations of the physical RRH.

5. The network infrastructure of claim 1, wherein slicing the RRH resources comprises slicing the RRH resources into a plurality of RRH slices and creating the virtual RRHs according to the RRH slices.

6. The network infrastructure of claim 1, wherein the orchestrator further creates a fronthaul radio data process graph according to the radio resource request, converts the fronthaul radio data process graph into a fronthaul specific command and sends the fronthaul specific command to the fronthaul controller.

7. The network infrastructure of claim 6, wherein managing the fronthaul resources comprises allocating the fronthaul resources and creating a plurality of virtual fronthaul according to the fronthaul specific command.

8. The network infrastructure of claim 7, wherein the fronthaul controller further converts a profile setting of the virtual fronthauls into configurations of physical fronthauls and applies the configurations to physical fronthaul network devices.

9. The network infrastructure of claim 1, wherein the RRH controller further performs the mapping between the virtual RRH and the physical RRH according to reception of a connection request from the least one C-RAN.

10. The network infrastructure of claim 9, wherein the RRH controller further configures the physical RRHs according to the mapping between the virtual RRH and the physical RRH.

11. The network infrastructure of claim 10, wherein the physical RRHs acknowledges the RRH controller by transmitting a response to the RRH controller.

12. The network infrastructure of claim 11, wherein the RRH controller returns a connection result back to the at least one C-RAN when receiving the response.

13. The network infrastructure of claim 12, wherein the at least one C-RAN sets up a radio flow between the at least one C-RAN and the physical RRHs when the connect request is accepted by SD-RRH.

14. The network infrastructure of claim 13, wherein the radio data flow is identified by a radio flow ID.

* * * * *